US011475120B2

(12) United States Patent
Gersten

(10) Patent No.: US 11,475,120 B2
(45) Date of Patent: Oct. 18, 2022

(54) SYSTEM AND METHOD FOR PASSWORD CODE GENERATION AND RECONSTRUCTION

(71) Applicant: Adam Gersten, Phoenix, AZ (US)

(72) Inventor: Adam Gersten, Phoenix, AZ (US)

( * ) Notice: Subject to any disclaimer, the term of this patent is extended or adjusted under 35 U.S.C. 154(b) by 450 days.

(21) Appl. No.: 16/568,217

(22) Filed: Sep. 11, 2019

(65) Prior Publication Data
US 2021/0073372 A1 Mar. 11, 2021

(51) Int. Cl.
*G06F 21/46* (2013.01)
*G06F 21/36* (2013.01)
*G06T 11/00* (2006.01)
*G06F 21/62* (2013.01)

(52) U.S. Cl.
CPC ............. *G06F 21/46* (2013.01); *G06F 21/36* (2013.01); *G06F 21/6245* (2013.01); *G06T 11/001* (2013.01); *G06T 2207/10024* (2013.01)

(58) Field of Classification Search
CPC ................................ G06F 21/36; G06F 21/46
See application file for complete search history.

(56) References Cited

U.S. PATENT DOCUMENTS

| | | | | |
|---|---|---|---|---|
| 6,720,860 | B1 * | 4/2004 | Narayanaswami | G06F 21/36 340/5.55 |
| 7,844,825 | B1 * | 11/2010 | Neginsky | G06F 21/83 713/184 |
| 8,301,900 | B1 * | 10/2012 | Juang | H04L 9/3226 713/184 |
| 8,756,672 | B1 * | 6/2014 | Allen | G06F 21/36 726/19 |
| 9,009,814 | B1 * | 4/2015 | Wertz | G06F 21/36 713/168 |
| 9,501,636 | B1 * | 11/2016 | Elshishiny | H04L 63/20 |
| 10,169,566 | B1 * | 1/2019 | Mossoba | G06F 40/12 |
| 10,182,047 | B1 * | 1/2019 | Buehl | G06F 3/04886 |
| 10,514,845 | B1 * | 12/2019 | Hamilton | H04M 1/724 |
| 2003/0041251 | A1 * | 2/2003 | Kumhyr | G06F 21/31 713/184 |
| 2010/0287382 | A1 * | 11/2010 | Gyorffy | G06F 21/36 713/185 |
| 2010/0333197 | A1 * | 12/2010 | Wang | G06F 21/36 726/19 |

(Continued)

OTHER PUBLICATIONS

Guerar, M., Benmohammed, M. and Alimi, V., 2016. Color wheel pin: Usable and resilient ATM authentication. Journal of High Speed Networks, 22(3), pp. 231-240. (Year: 2016).*

(Continued)

*Primary Examiner* — James R Turchen

(57) ABSTRACT

A process for generating and recalling password schemes using a series of color selections and transformative rules to generate a strong and complex password code to stop online crime and identity theft as well as preserve the user's privacy and counter the financing of international terrorism. As part of the process, subsequent to using the color selections and generating a strong password, the password code may be inserted into a third party website or application or stored into the keychain of a computing device. Further, the color selections presented may be defined by the color blindness identification of the user so that the process and system may be accessible for anyone including those people with visual impairment.

2 Claims, 28 Drawing Sheets

(56) References Cited

U.S. PATENT DOCUMENTS

| | | | | |
|---|---|---|---|---|
| 2012/0124654 | A1* | 5/2012 | Senac | G06F 21/36 |
| | | | | 726/7 |
| 2012/0260326 | A1* | 10/2012 | Steigmann | G06F 21/33 |
| | | | | 726/7 |
| 2014/0317723 | A1* | 10/2014 | Hicks | G06F 21/36 |
| | | | | 726/19 |
| 2015/0121489 | A1* | 4/2015 | Yang | G06F 3/04817 |
| | | | | 726/6 |
| 2015/0137944 | A1* | 5/2015 | Fuerth | G07C 9/33 |
| | | | | 340/5.85 |
| 2017/0302648 | A1* | 10/2017 | Ferrydiansyah | H04L 63/083 |
| 2018/0288019 | A1* | 10/2018 | Dinia | H04L 9/3239 |
| 2020/0026843 | A1* | 1/2020 | Anwar | G06F 3/0446 |
| 2021/0026943 | A1* | 1/2021 | Tiller | G06F 21/62 |
| 2021/0312030 | A1* | 10/2021 | Maroshi | G06F 21/36 |

OTHER PUBLICATIONS

Thomas, A., Rajan, H. Thomas, L., Farize, M., May 2015, Color Scheme Password Encryption & Storage. International Journal of Engineering Research & Technology (IJERT), 4(5), pp. 1104-1108 (Year: 2015).*

* cited by examiner

SYSTEM AND METHOD FOR PASSWORD CODE GENERATION AND RECONSTRUCTION

FIELD OF THE DISCLOSURE

This disclosure generally relates to the field of electronic devices and/or software systems that generate passwords for computer-based accounts. More particularly, the present invention relates to a system for generating or reconstruction of a complex password associated with individual shades of colors, including primary or secondary colors. Further, the system may use designated transformative rules to generate the complex password.

BACKGROUND

Many websites and applications containing sensitive information require users to enter their username and password as login information to gain access to a platform and access content or information provided by the application or website, including any access to relevant files or databases. The username and password are designed to validate the user's identity and allow these users certain privileges when accessing the platform. The primary problem associated with passwords is that the information is vulnerable to hacking by outside parties. Anyone can attempt to log into the account of another by guessing a username and password and may make multiple attempts to guess the information or obtain the information using other hacking techniques that involve compromising a user's privacy and identity.

The majority of passwords created by users are extremely easy to remember or have been used throughout multiple sites even though these passwords protect extremely sensitive information such as banking accounts. Likewise, extremely complicated passwords are often written down or stored somewhere, and either forgotten by a user too easily or found and stolen.

Thus, there still exists a need for a better system and method for generating passwords that are unique to a user and may be created specifically for a user in a manner that is not overly complex to the user, but that ultimately generate a complex set of passwords that would be difficult to impossible for unauthorized users to figure out.

SUMMARY

The disclosure presented herein relates to a system for generating a password code including one or more processors and a non-transitory computer readable medium having instructions that, when executed, cause the one or more processors to perform the following steps, receive an input from a user, the input comprising one or more individual shade of color selections to be used as a first password generation phrase to be input into a password code generation and reconstruction engine, identify a sequence of associated alphanumeric characters for each of the one or more individual shade of color selections received from the user by executing a request in a database of sequences of associated alphanumeric characters, receive the sequences of associated alphanumeric characters from the database by the password code generation and reconstruction engine, and execute a request using the sequences of associated alphanumeric characters to generate a first password code, the first password code comprising the respective alphanumeric characters from each of the sequences, displaying to the first password code to the user, receive an input from the user, the input comprising the one or more primary or secondary color selections, identify associated individual shades of colors for each of the one or more primary or secondary color selections received from the user by executing a request in a database of sequences of associated individual shades of colors, receive the associated individual shades of colors from the database by the engine, display the associated individual shades of colors to the user, receive an input from the user, the input comprising one or more colorblindness identification selections, identify associated primary and secondary colors for each of the one or more one or more colorblindness identification selections received from the user by executing a request in the database, the database having sequences of one or more colorblindness identification selections, receive the associated primary and secondary colors from the database by the engine; display adjusted primary colors and secondary colors upon the information color blindness identification selected by the user access a database of transformative rules chosen by the user to be applied to the first password code, receive the transformative rules from the database by the engine, execute a request applying the transformative rules to generate a second password code from the first password code; display to the second password code to the user, permit user selected predefined editing operations to operate on the contents of the transformative rules, apply an operator to the sequences of the associated alphanumeric characters selected by the user thereby so as to form the first password code with a specific order of alphanumeric characters from each of the sequences, receive an input from the user, the input comprising the amount of sequences for associated characters required in generating the first password code; provide a number of individual shade of color selections to the user corresponding to the amount of sequences for associated characters required, whereby the sequence of the associated alphanumeric characters is based on the value of the Hexadecimal color codes or RGB of the individual shade of color, whereby the transformative rules comprise at least one of: Every n letter is capitalized, Every n digit stays a number, Every n digit may be replaced by the corresponding keyboard's alternate symbol, the n corresponding to the user selected predefined editing operations.

The preceding and following embodiments and descriptions are for illustrative purposes only and are not intended to limit the scope of this disclosure. Other aspects and advantages of this disclosure will become apparent from the following detailed description.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations, and are not intended to limit the scope of the present disclosure.

DETAILED DESCRIPTION

Figure 1:
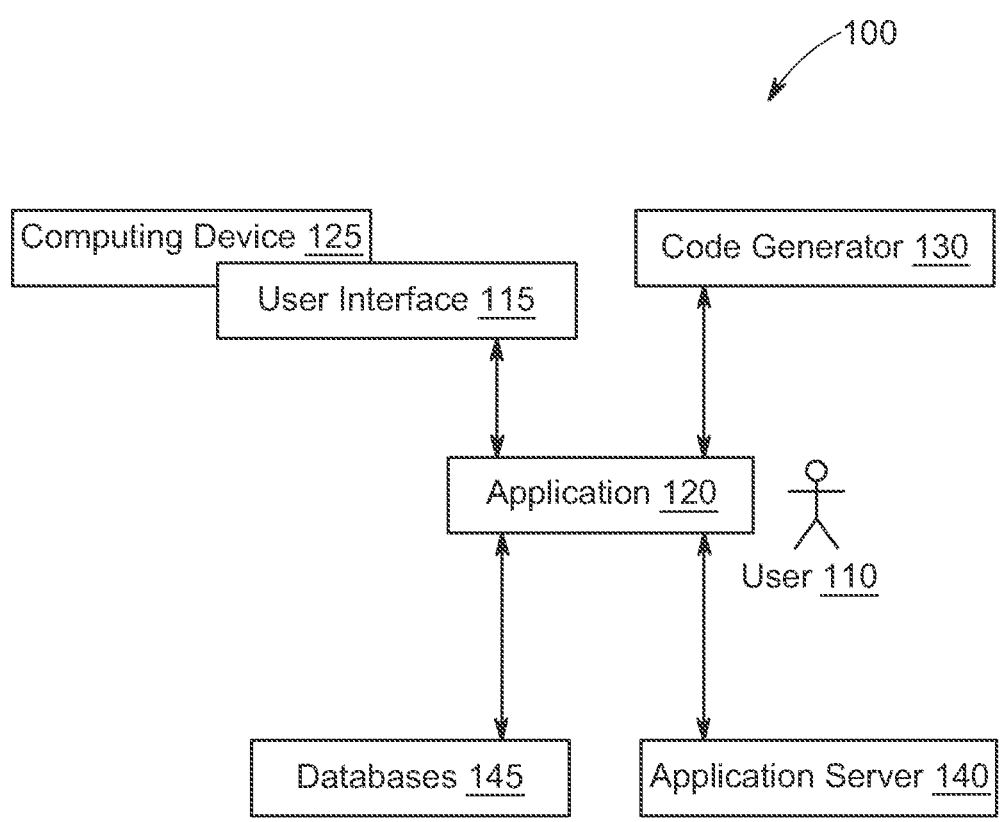
FIG. 1 depicts a schematic diagram of a password code generation and reconstruction system according to an illustrative embodiment.

In the Summary above and in this Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises", and grammatical equivalents thereof are used herein to mean that other components, ingredients, steps, among others, are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limit is the second number. For example, 25 to 100 mm means a range whose lower limit is 25 mm and upper limit is 100 mm.

Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The password code generation and reconstruction system featured in the present invention delivers a fundamental shift in the way passwords are created and recalled to stop online crime and identity theft as well as preserve the user's privacy. Further, protecting against online crime and identity theft is an important part of the efforts to counter international terrorism, as online crime and identity theft is being recognized more and more for sources of terrorist financing. One or more embodiments described in the present description provide for a password code generation and reconstruction system that may allow a user to create a personal password of extraordinary complexity without the need to actually remember the password code. The password code may be created by selecting a series of colors and applying a string of transformative rules. A user may select the colors based on, without limitation to the following, preference, emotion, colors they are connected to, colors associated by the user with a given account, or even at random.

After generating the password code, the user may copy and paste the password code into an application or website for an enrollment session. The user may then once again select a series of colors and apply a string of transformative rules to create the password code once again, whereby the user may copy and paste the password code into an application or website for a user verification session. The password code generation system also allows the user to save the password code to a keychain for retrieval by the user via any other method known by those of ordinary skill in the art in case the user forgets the password because of memory loss or some form of illness.

FIG. 1 is an exemplary block diagram of a password code generation and reconstruction system constructed in accordance with an illustrative embodiment. Password code generation and reconstruction system 100 may be utilized by users such as user 110, whereby user 110 interacts with an application such as application 120. User 110 may be located at any physical location as desired by user 110.

Application 120 may be downloadable and installable by a user onto any suitable computing device, such as computing device 125. A computing device, such as computing device 125, and exemplary components is discussed in more detail later in the description with respect to at least FIG. 8. In some embodiments, application 120 may be preinstalled on computing devices 125 by the manufacturer or designer. Further, code generation application 120 may be implemented using a web browser via a browser extension or plugin. Application 120 may be innate, built into, or otherwise integrated into existing platforms such as, without limitation thereto, a website, third-party program, iOS™, Android™, Snapchat™, Getty Images™, Instagram™, Facebook™, or any other platform capable of transmitting, receiving, and presenting data.

Further, a user interface, such as user interface 115, may be displayed to user 110 via application 120. User interface 115 may be included with application 120. User interface 115 may have a plurality of buttons or icons or other types of selector tools that are selectable through user interface 115 by user 110 to instruct application 120 to perform particular processes in response to the selections.

To assist the user 110 in generating and/or recalling a password code, application 120 may include or otherwise interact with a code generator program, such as code generator program 130. Code generator 130 helps user 110 generate and recall a password code by converting a series of color selections to alphanumeric code and transforming the alphanumeric code using a set of transformative rules. For example, code generator 130 may be built into application 120 as a component of application 120 or may be separate application that communicates with application 120 and is able to independently provide user 110 with a generated password code. Code generator 130 may dynamically interact with the user 110 via application 120 such as by computer programming languages, including but not limited to, asynchronous JavaScript™ and XML™ (AJAX)™.

Application 120 and code generator 130 may be in communication with one or more databases, such as databases 145. Databases 145 may each reside on a single computing device 125 as a database or exist as separate components distributed over a network and accessible through application 120. Database 145 maintains and stores data specifics for color selection or identification information, including but not limited to, hexadecimal color code or identification information, RGB (red, green, blue) color model or scheme, CMYK (cyan, magenta, yellow, and key or black) color model or scheme, PANTONE color matching system or identification information, color grouping information, color blindness identification grouping information, and transformative rules. Further, data requests from databases 145 are anonymized or otherwise obfuscated to the origin of the requests such that a third party may not determine that user 110 was the individual going through the process of generating and reconstructing the specific password code.

Code generator 130 is able to generate a complex password that is based on a selection of colors by a user, such as user 110. User 110 may select any colors, including primary or secondary colors, in one or more embodiments by relying on the colors presented via RGB color model/identification scheme or a CMYK color model/identification scheme.

RGB color model is a type of color model or way to identify colors for specific devices. RGB color model uses red, green, and blue light and adds them together in various ways to produce a broad array of colors. Scanners, digital cameras and computer monitors use red, green and blue (RGB) light to display color.

CMYK color model is another method known in the art for identifying a certain process or standard associated with color. Commercial printing presses print with cyan, magenta, yellow, and black (CMYK ink) called process printing, instead of RGB light, and therefore produce a different range of color. Therefore, RGB primary colors may need to be converted into CMYK colors at times to print.

In other embodiments, user 110 may select the colors that may be used by code generator 130 to generate a passcode based on the colors by first selecting colors from a PANTONE color matching scheme or model. PANTONE is a standardized color matching system, utilizing the PANTONE numbering system for identifying colors. By standardizing the colors, different manufacturers or other users may reference a PANTONE numbered color to make sure colors match without any confusion. The PANTONE palette includes thousands of colors to select from that are standardized and matched to a specific number and have many varying shades.

In one or more embodiments, colors may be classified in 6-digit hexadecimal values or hexadecimal code. However, it should be understood that the available colors for classification may be adjusted or expanded or that each hexadecimal code can be converted into component PANTONE, RGB, or CMYK values and/or a binary representation as well. Any other color codes or models used in one or more alternative embodiments may be converted in a similar manner.

In some embodiments, each individual shade of color identification entry in database 145 corresponds to hexadecimal and RGB alphanumeric color code stored in one or more databases, such as databases 145. For instance, steel blue has a hexadecimal code of 4682b4, an RGB value of 7030180, an octal value of 106202264. Hexadecimal color is a 6-digit, 24 bit, hexadecimal number that represents Red, Green, and Blue. An example of a Hex color representation is #123456, 12 is Red, 34 is Green, and 56 is Blue. Hexadecimal systems symbols may be a combination of the symbols {0, 1, 2, 3, 4, 5, 6, 7, 8, 9, A, B, C, D, E, F} for a specific color. It is thought there may be at least 16 million possible colors. RGBA (red, green, blue, alpha) may also be used. RGBA color values are an extension of RGB color values with the extra inclusion of an alpha channel, which specifies the opacity of a color. In one or more embodiments, RGBA may be similar to Hex in that it has 24 bits for RGB color, but there is an additional 8 bit value for transparency. In some embodiments, hue, saturation, and lightness or HSL may be used. The values of HSL are based on a position from the center of a color wheel. The value for Hue is from 0 to 360, representing the degrees on a color wheel. Saturation is the distance from the center of the color wheel. The Lightness represents the perceived luminance of the color. Any other color code systems may also be employed. In some embodiments, a binary coded decimal system may instead be used whereby a binary code may range from a four position binary code 0000 to 1111, whereby each decimal digit is therefore represented by four bits.

In operation, after selecting a first individual shade of color, code generator 130 sends a request to database 145 for associated individual shades of colors, based on the first individual selection by user 110, whereby each individual shade of color in the database 145 is associated with a set of alphanumeric characters related to the hexadecimal color code, RGB code, PANTONE Matching System (PMS) code, CMYK code, or any other code used to identify individual shades of colors. For example, if user 110 selected the color "red" through user interface 115, database 145 may be queried or otherwise requested for the information resources whereby code generator 130 may return a sequence of alphanumeric characters corresponding to the color red.

Color grouping information may also be stored in database 145 whereby groups of individual shades of colors associated with one or more primary or secondary colors. For example primary color red may be associated with individual shades of colors such as, without limitation thereto, auburn, baby pink, burgundy, burnt sienna, cardinal red, carmine, carnation, carroty, cerise, cherry, chestnut, cinnabar, claret, copper, coral, crimson, cyclamen, damask, dubonnet, flame, flesh, foxy, fuchsia, ginger, grenadine, gules, henna, liver, magenta, maroon, mulberry, old rose, oxblood, pink, plum, poppy, puce, raspberry, rose, roseate, rosy, ruby, russet, rust, sandy, scarlet, shell pink, strawberry, tea rose, terracotta, titian, turkey red, vermeil, vermilion, and wine.

A following illustrative example for how password code generation and reconstruction system 100 may be used is described below. In one or more non-limiting embodiments, user 110 is from Phoenix and has decided that each of the colors for the sports teams associated with the city of Phoenix will be used as user's 110 selected colors to make up a password using password code generation and reconstruction system 100. The city of Phoenix has at least the following sports teams, which are the Cardinals, the Coyotes, the Diamondbacks, and the Suns. Further, it is noted that the Cardinals and Coyotes have three team colors, while the Diamondbacks and the Suns have five team colors, but each may be identified by their dominant colors. For instance, the colors for the Arizona Cardinals™ are Red and White, which correspond to the following numbers using either a Hex color code scheme, a CYMK color code scheme, or a PANTONE matching color code scheme: Red (Hex Color Code: 97233f; CMYK: 0, 100, 60, 30; PANTONE Matching System: 194 C) & White (Hex Color Code: ffffff; CMYK: 0, 0, 0, 0; PANTONE Matching System: 11-0601-TCX). To further elaborate on the example, the Arizona Diamondbacks™ are comprised of Sedona Red (Hex Color Code: a71930; CMYK: 23, 100, 83, 17; PANTONE Matching System: 7500 C) & White (Hex Color Code: ffffff; CMYK: 0, 0, 0, 0; PANTONE Matching System: 11-0601-TCX). The colors associated with the Arizona Coyotes™ are Brick Red and Desert Sand, whereby such codes may be associated as follows by password code and generation system 100: Brick Red (Hex Color Code: 8c2633; CMYK: 29, 94, 75, 28; PANTONE Matching System: 202 C) & Desert Sand (Hex Color Code: e2d6b5; CMYK: 11, 12, 31, 0; PANTONE Matching System: 468 C). Additionally, the NBA team Phoenix Suns are known for the colors Purple and Orange, which may be associated as follows: Purple (Hex Color Code: 1d1160; CMYK: 98, 100, 0, 43; PANTONE Matching System: 275) & Orange (Hex Color Code: e56020; CMYK: 0, 75, 100, 5; PANTONE Matching System: 159).

It is an advantage of the one or more embodiments described herein that user 110 may have an easier time remembering colors than other types of data to generate his or her passcode. For example, user 110 may easily remember the colors of his or her favorite sports teams, because user 110 keeps track of the teams throughout their respective season and frequently sees or hears about such colors. Thus, it may be easier and more natural for user 110 to select a passcode composed of numbers and/or other symbols that use one or more transformative rules based on such colors that are memorable to user 110. As noted above, the above example is non-limiting in nature and user 110 may select any colors he or she desires without limitation to colors associated with a sports team.

In some embodiments, application 120 may be in communication with an application server 140 whereby user 110 may use application 120 in order to request various resources from the application server 140 based on input through user interface. Application server 140 may be located at a data center or any other location suitable for providing service to a network whereby application server 140 may be in one central location or in many different locations in multiple arrangements. Application server 140 may comprise a database server such as MySQL® or Maria DB® server. Application server 140 may have an attached data storage system storing software applications and data. Application server 140 may receive requests and coordinates fulfillment of those requests through other servers.

Figure 2:
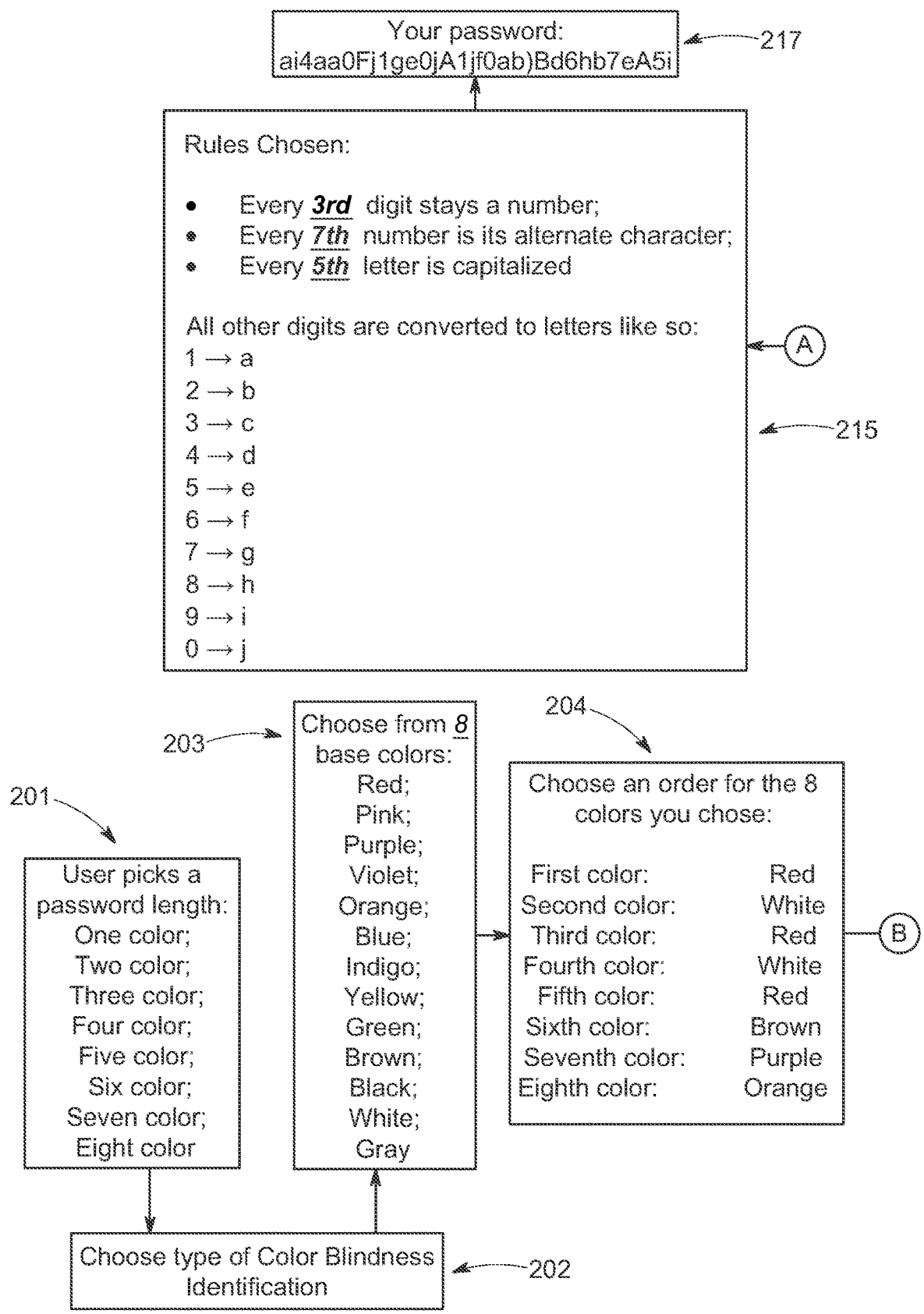
FIG. 2 shows a flowchart for generating a PANTONE based color code password using a password code generation and reconstruction system according to an illustrative embodiment.
Figure 2:
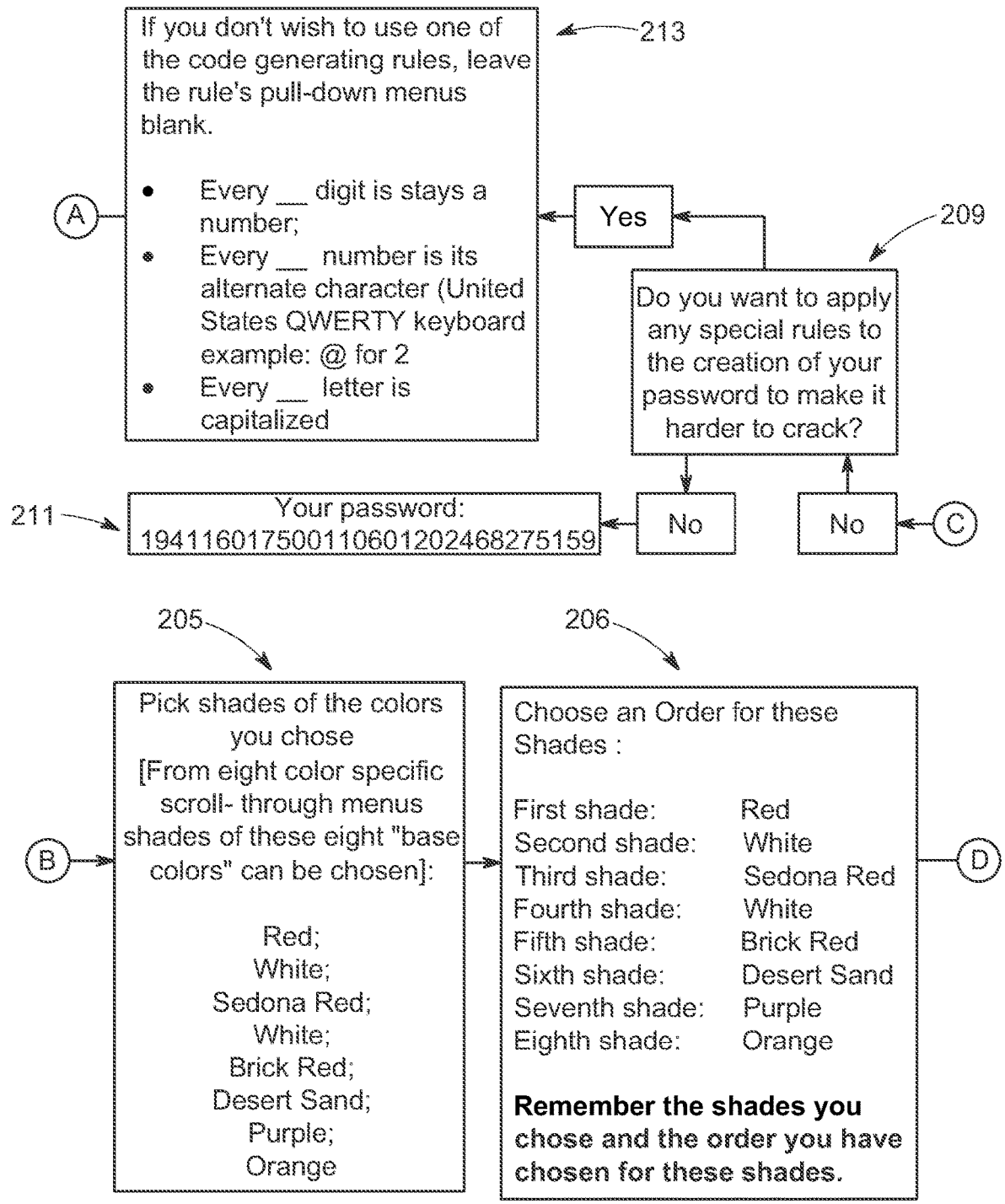
Figure 2:
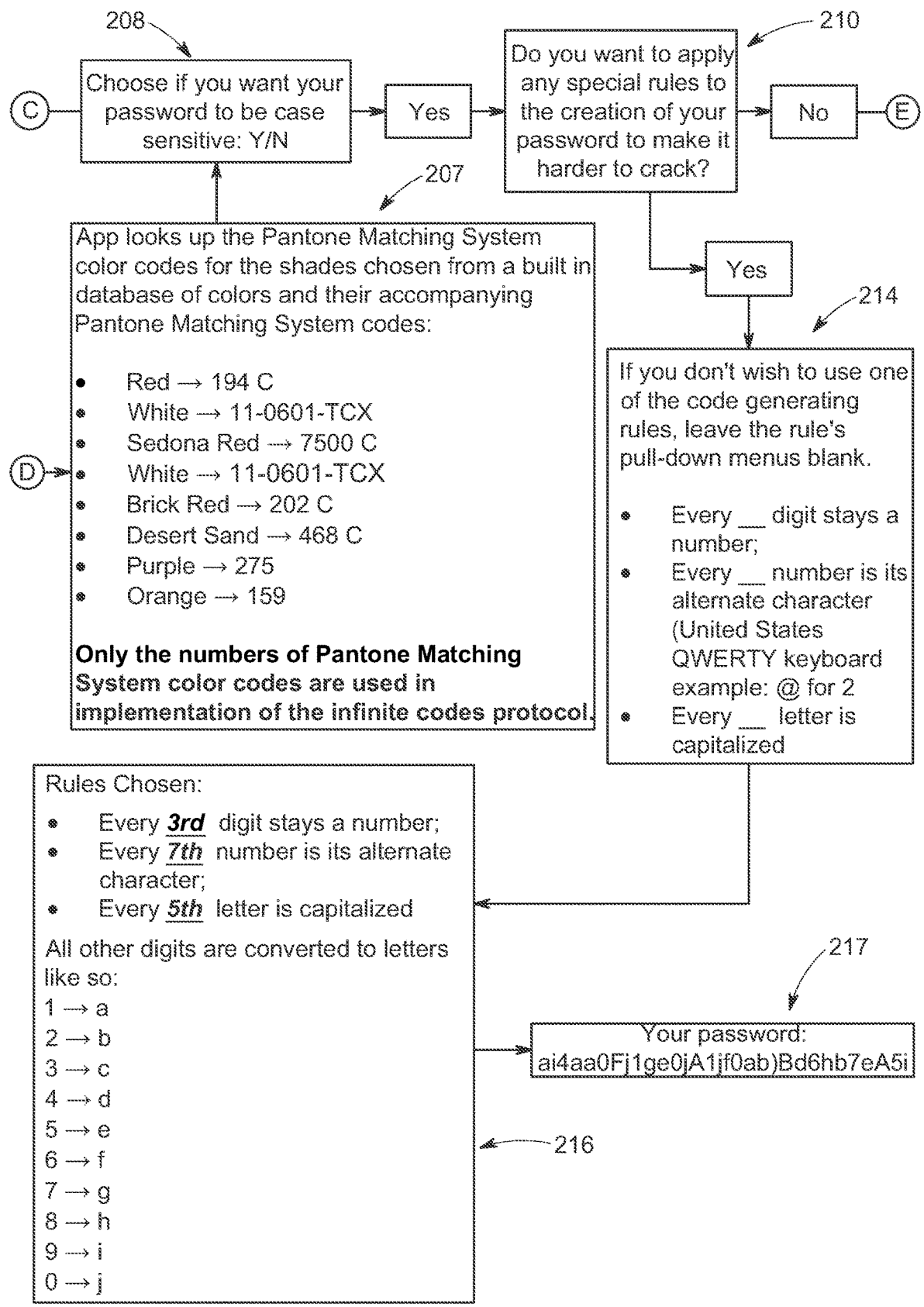
Figure 2:
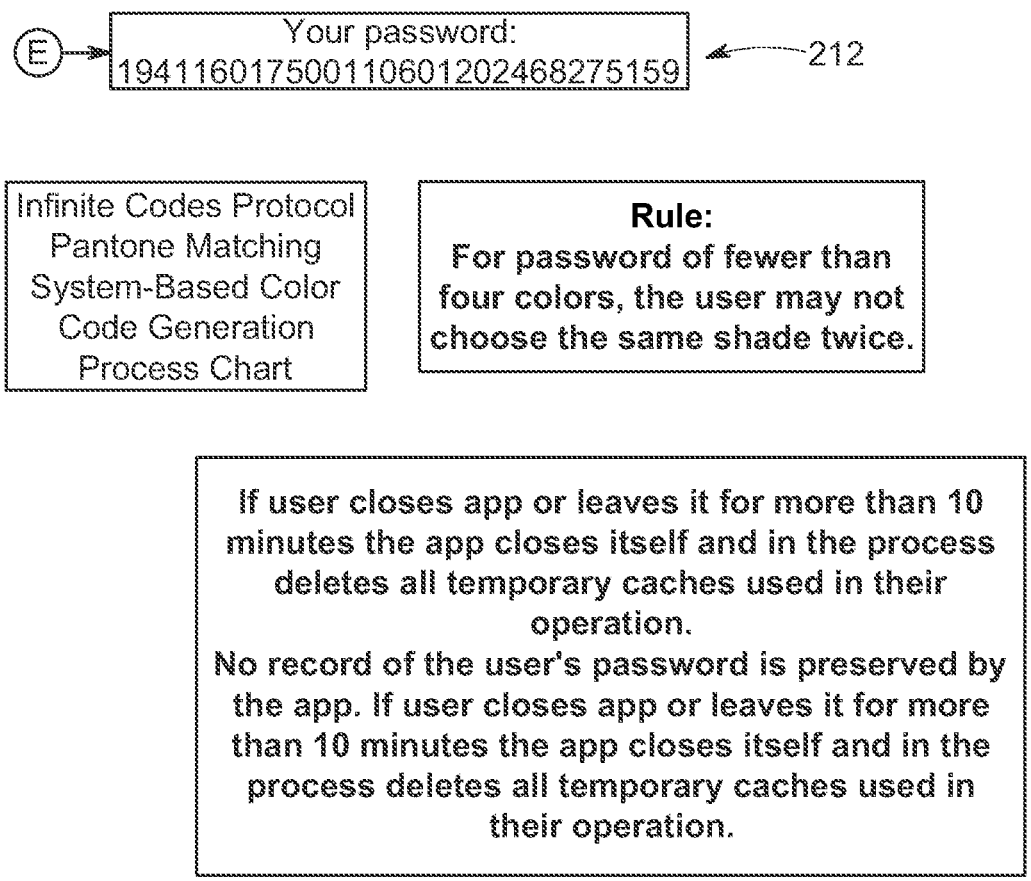
Figure 3:
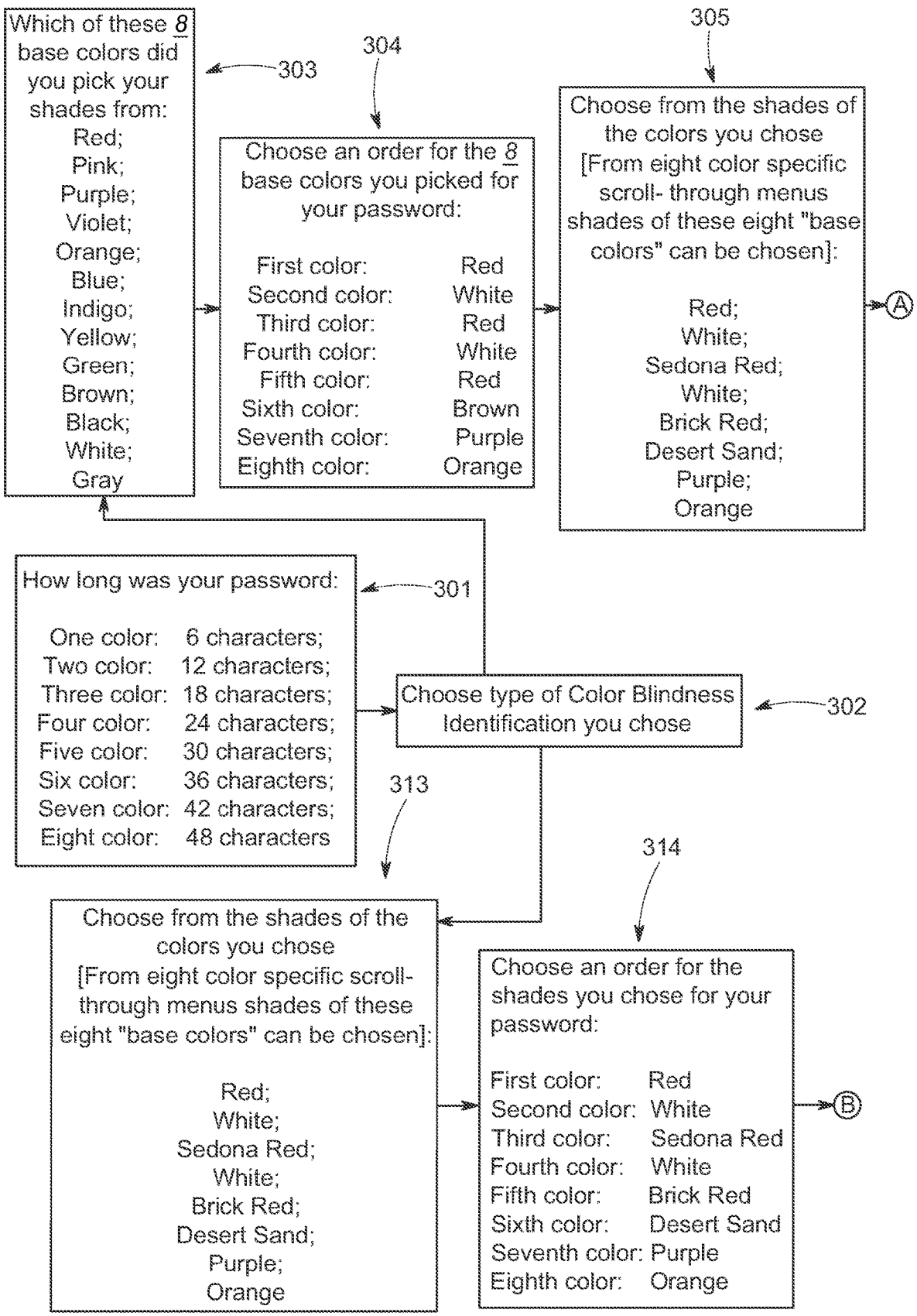
FIG. 3 shows a flowchart for reconstructing a PANTONE based color code password using a password code generation and reconstruction system according to an illustrative embodiment.
Figure 3:
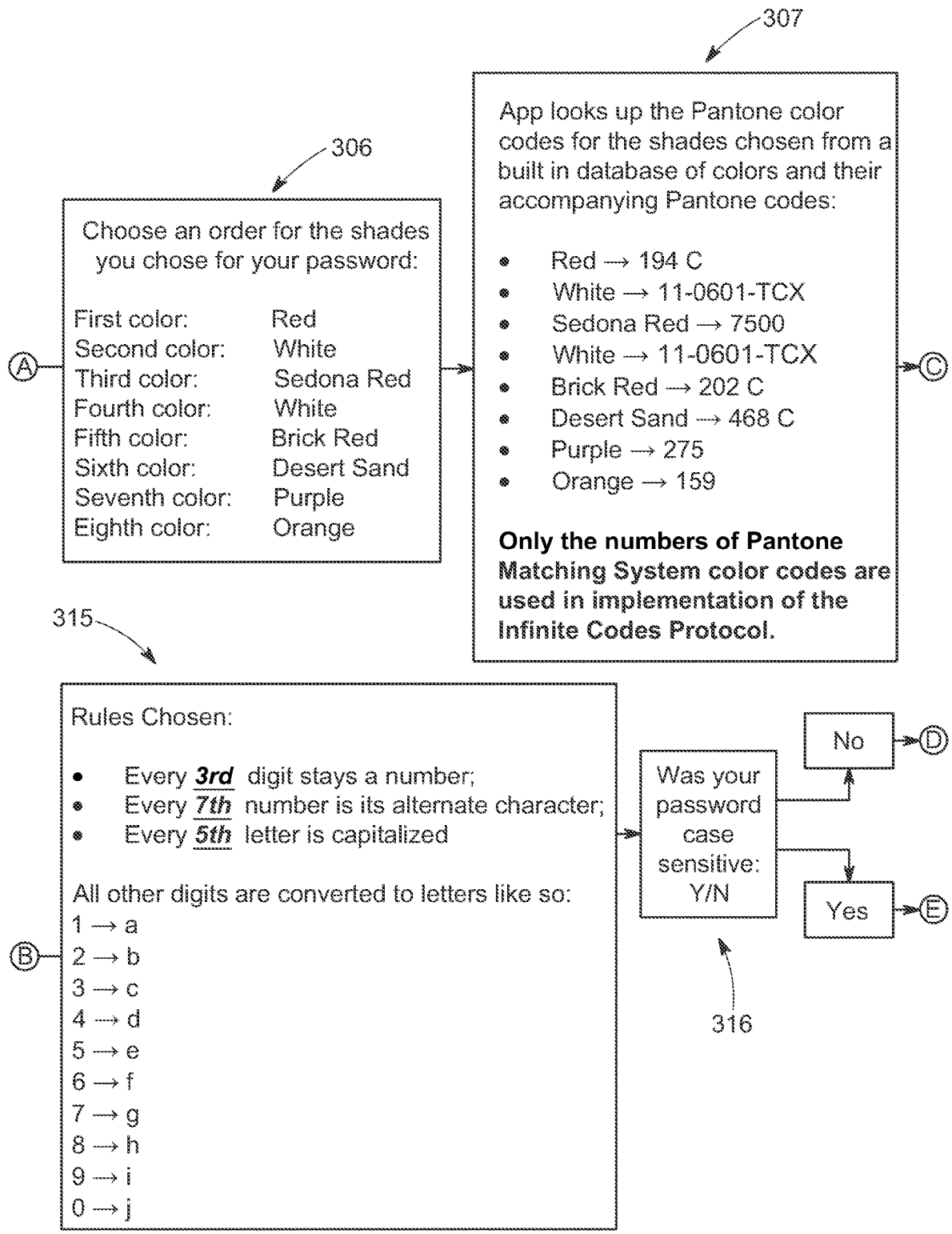
Figure 3:
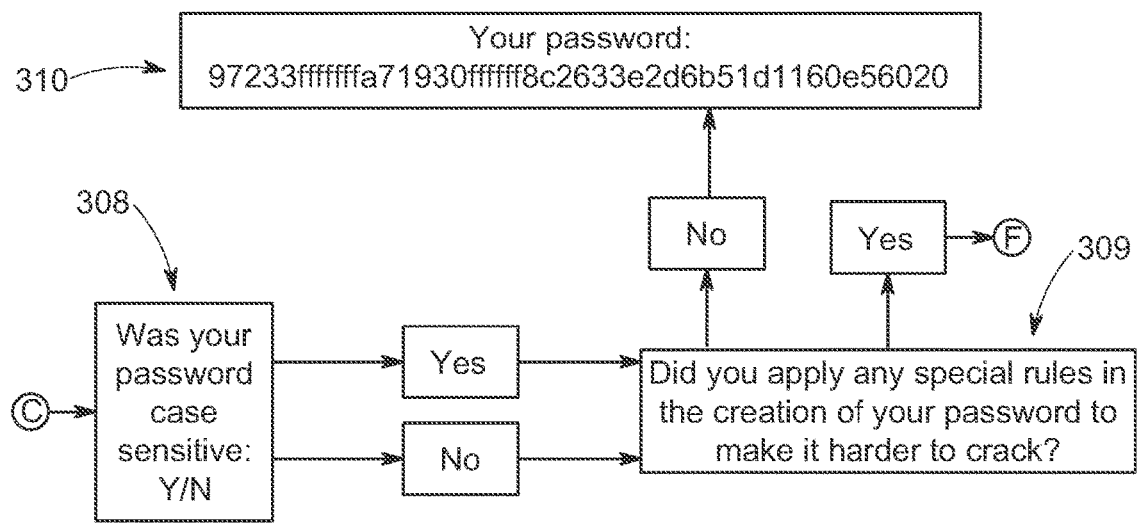
Figure 3:
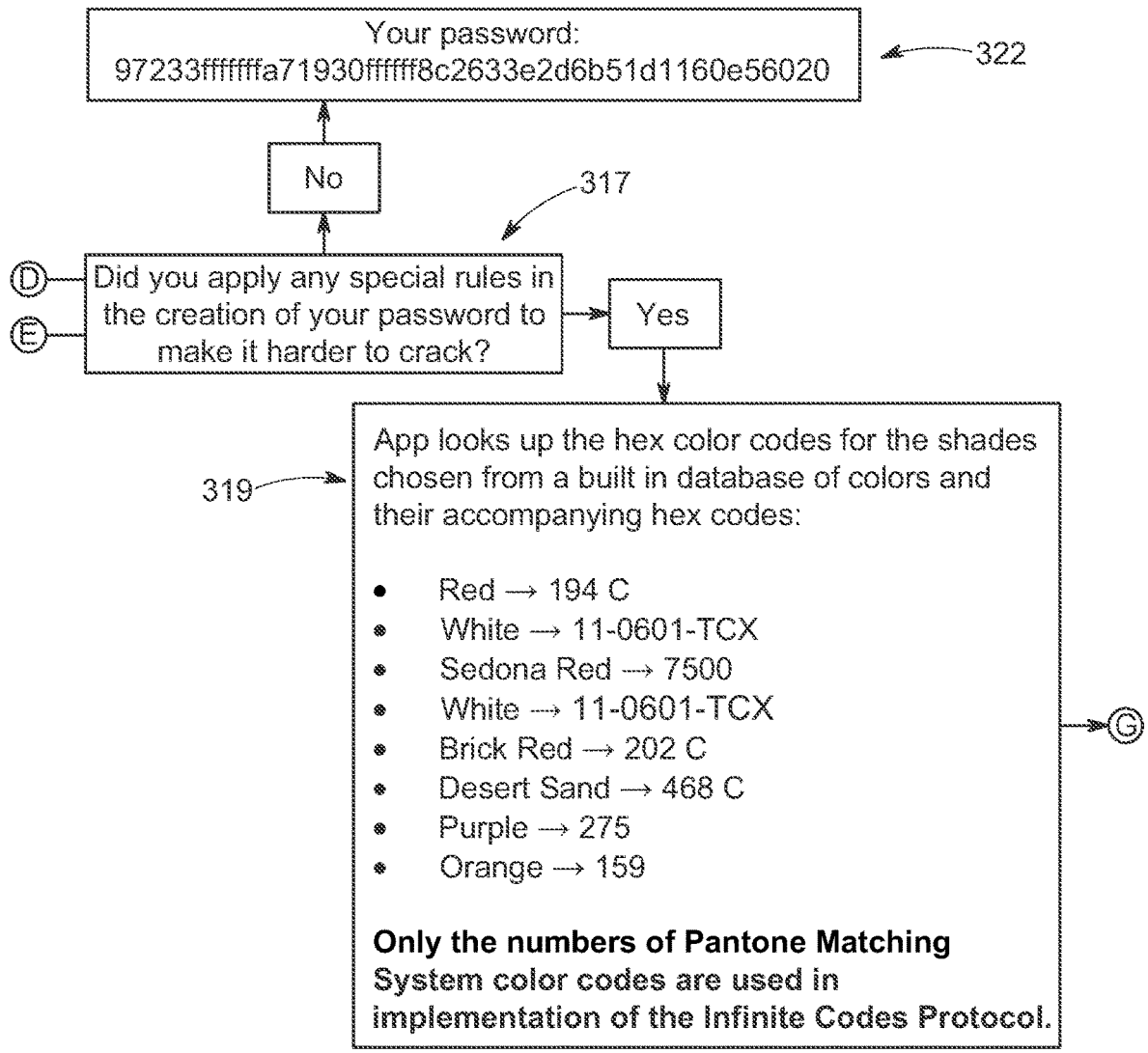
Figure 3:
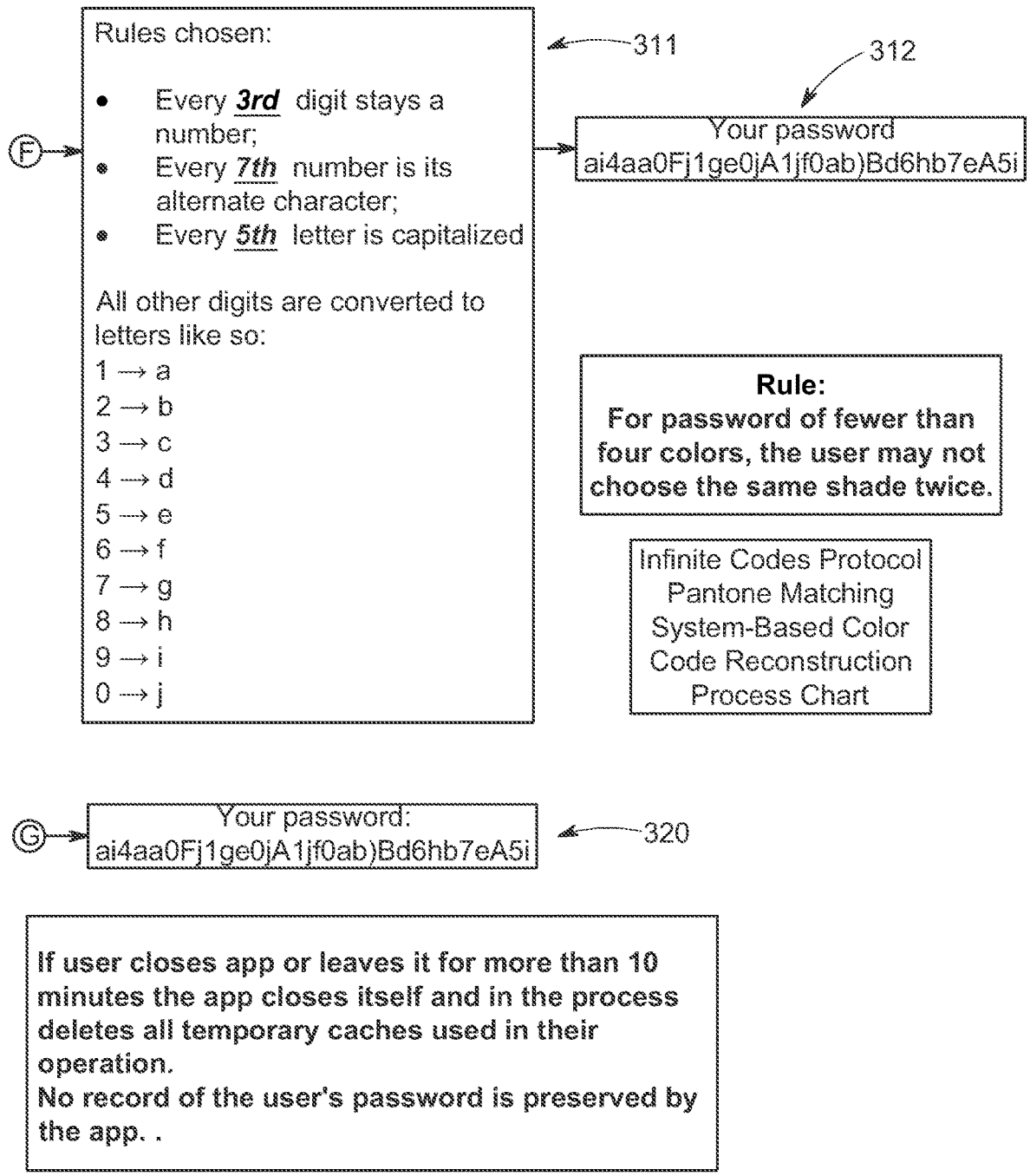

FIG. 2 and FIG. 3 illustrate flowcharts of an exemplary method for implementing or using a password code generation and reconstruction system, such as password code generation and reconstruction system 100 using an Infinite Codes Protocol with PANTONE color based code generation. The method shown in FIG. 2 may be implemented using one or more apparatuses or components, including without limitation thereto, computing devices 125, application 120, and databases 145 illustrated in FIG. 1. The Infinite Codes Protocol, as referenced herein, may refer to a system capable of constructing infinitely complex passwords for which the user need only remember an order of colors and one or more transformation rules. Using this system, the user just has to focus on remembering the string of colors they have chosen in the correct order and any transformation rules they chose to apply. Accordingly, a user does not have to remember strings of letters, numbers, and/or symbols. Rather, the one or more embodiments of system 100 are more advantageously design so that user 110 need only remember a series and order of user selected colors and the one or more rules to convert the colors into strings of letter, numbers, and/or symbols.

In one or more embodiments, password code generation and reconstruction system 100 does not store any of the generated or reconstructed passwords, and may purge, delete, or otherwise erase any caches associated with any of the following operations at the conclusion of the session, such as, without limitation thereto, when the user 110 closes the password code generation and reconstruction system 100, or after a set period of inactivity the password code generation and reconstruction system 100 may purge its caches whereby password code generation and reconstruction system 100 automatically closes or shuts down.

FIG. 2 shows a flowchart for generating a PANTONE based color code password using a password code generation and reconstruction system according to an illustrative embodiment. FIG. 3 shows a flowchart for reconstructing a PANTONE based color code password using a password code generation and reconstruction system according to an illustrative embodiment.

Figure 4:
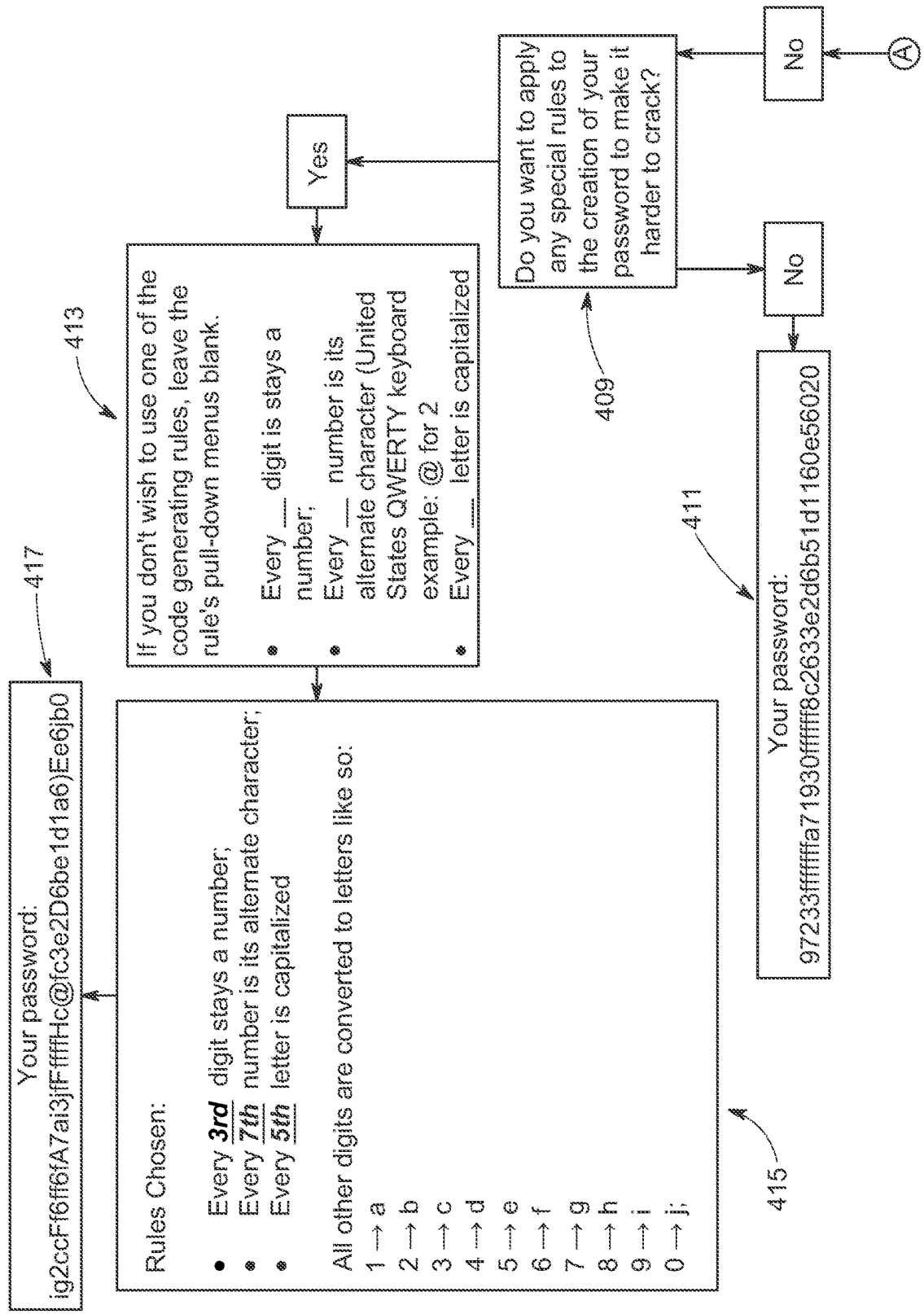
FIG. 4 shows a flowchart for generating a Hexadecimal-based color code password using a password code generation and reconstruction system according to an illustrative embodiment.
Figure 4:
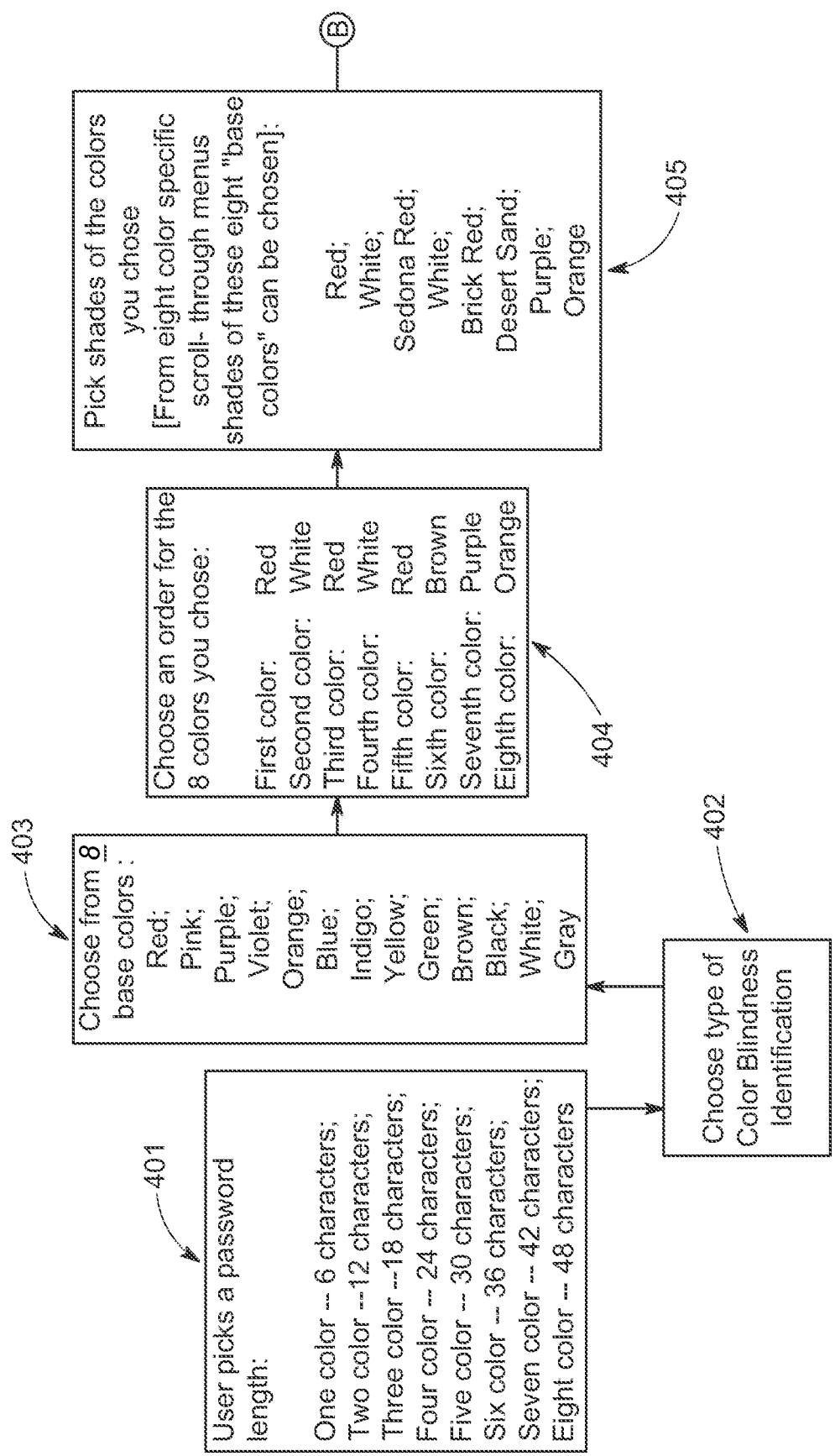
Figure 4:
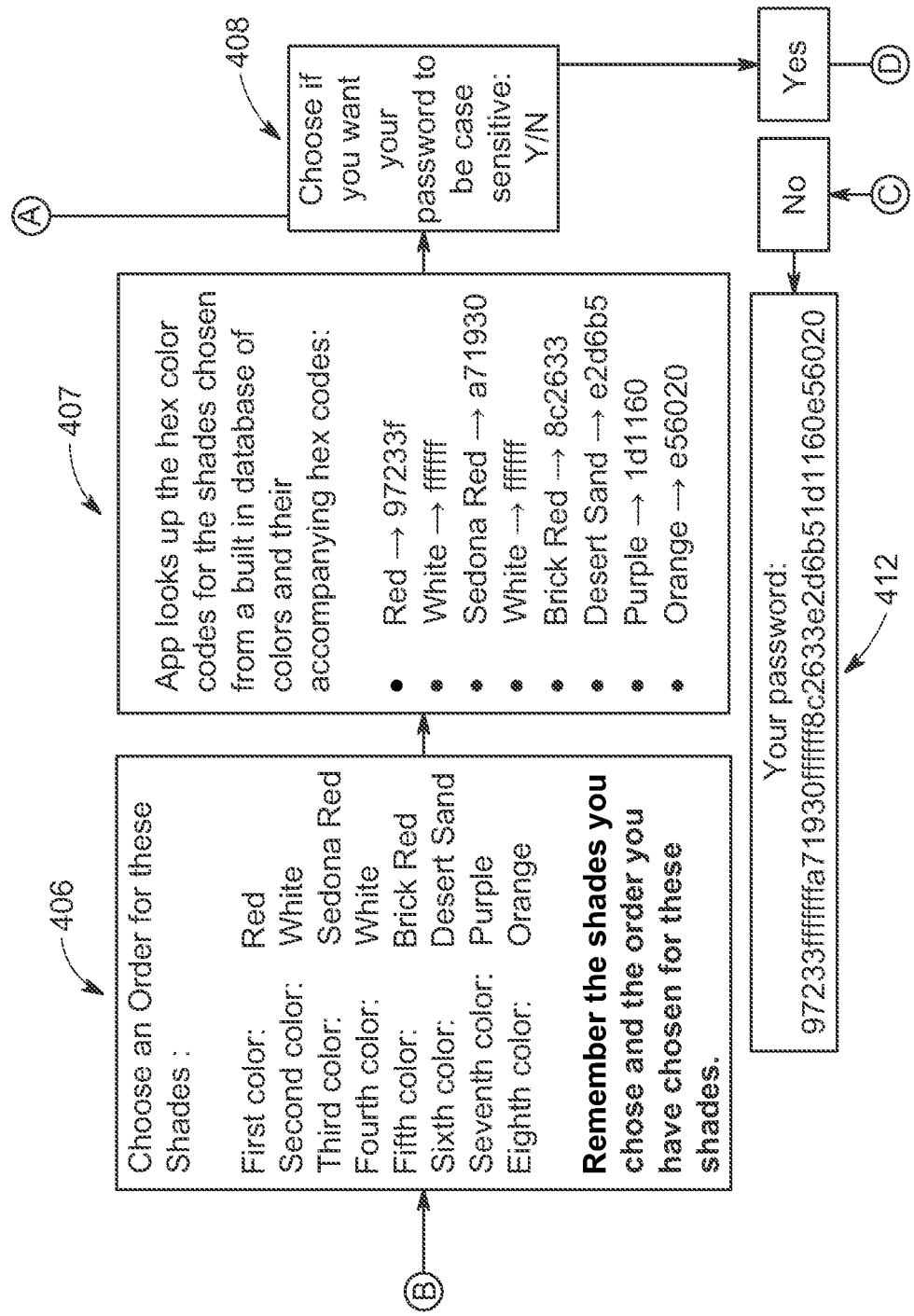
Figure 4:
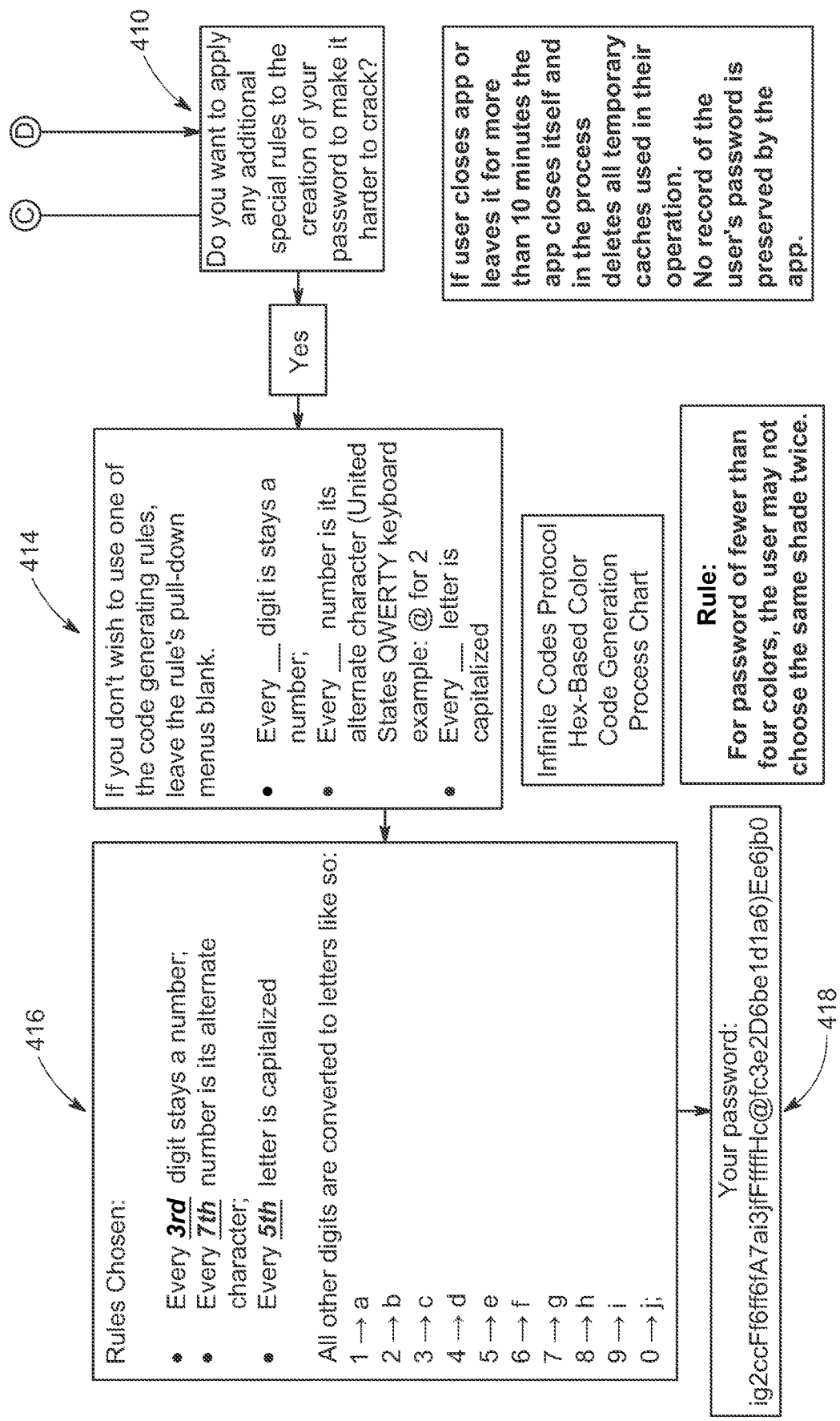
Figure 5:
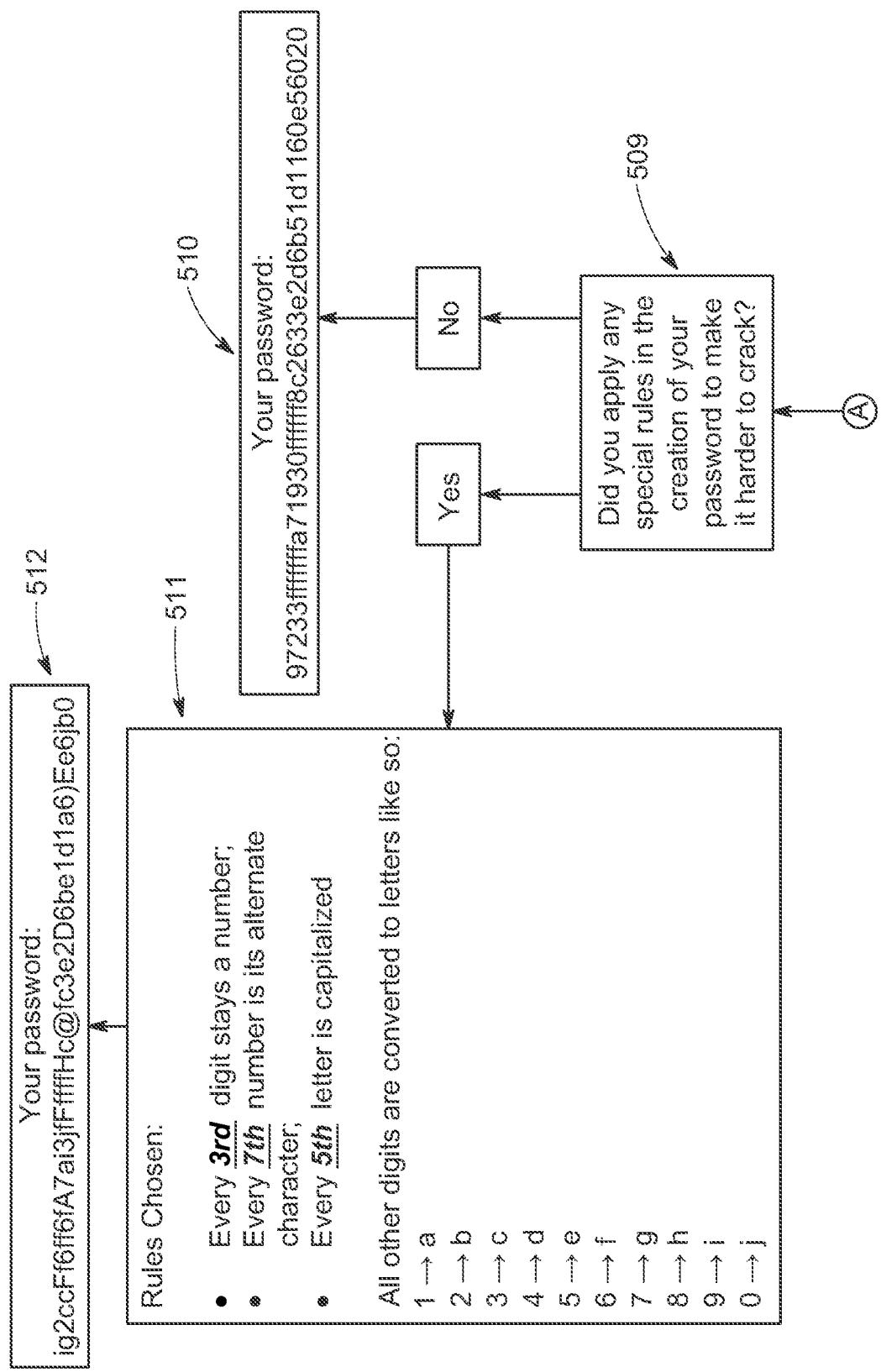
FIG. 5 shows a flowchart for reconstructing a Hexadecimal-based color code password using a password code generation and reconstruction system according to an illustrative embodiment.
Figure 5:
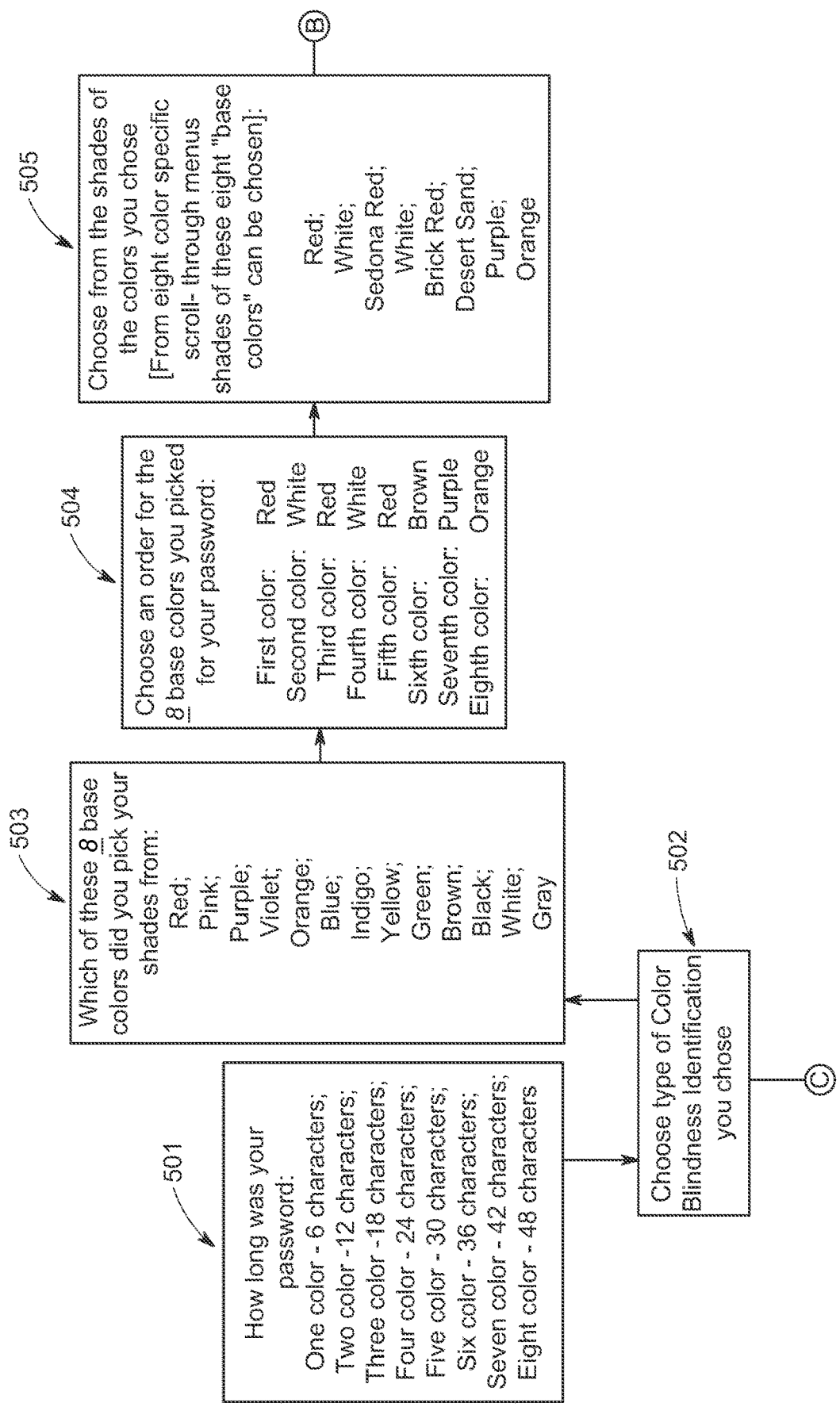
Figure 5:
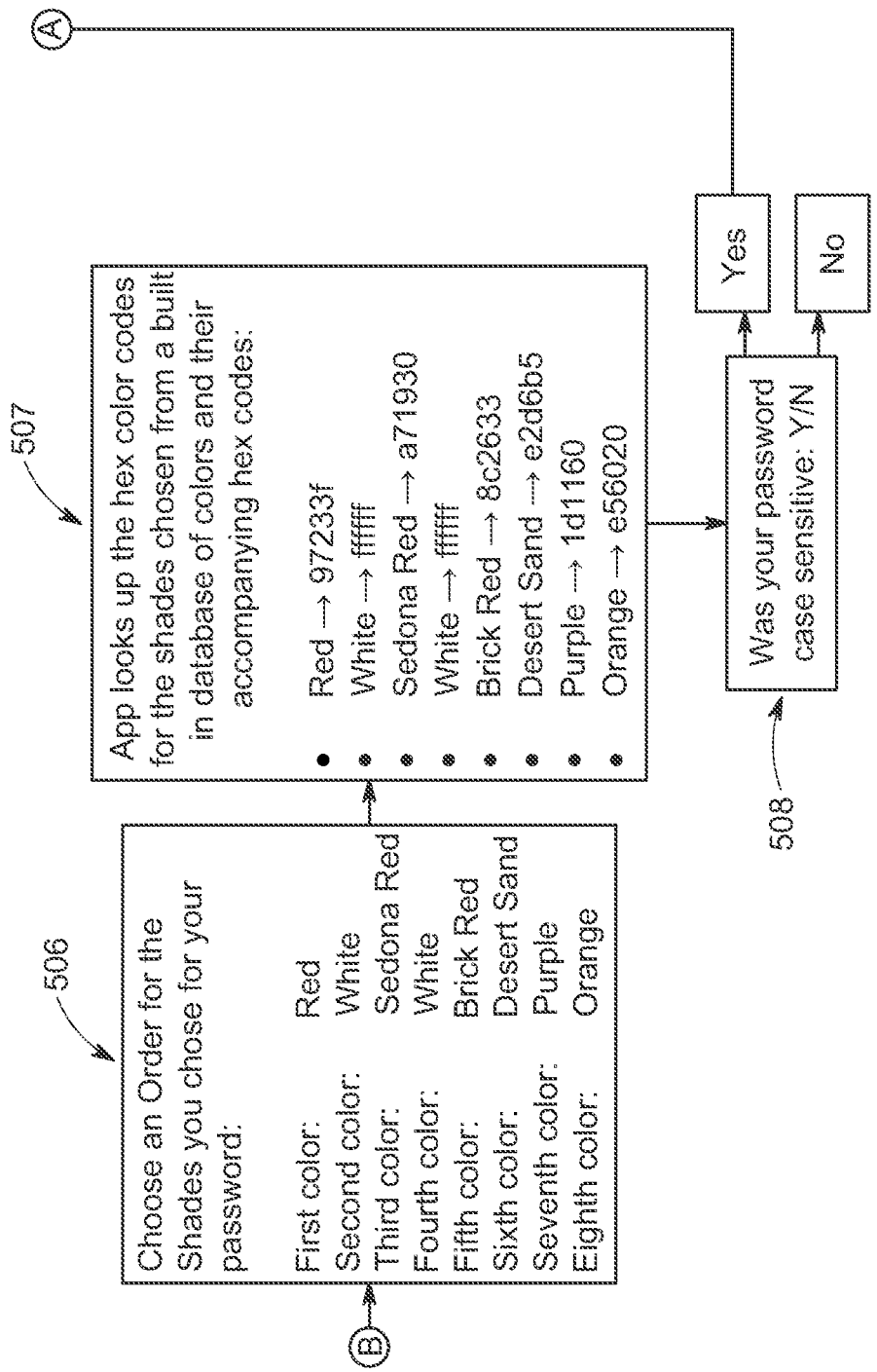
Figure 5:
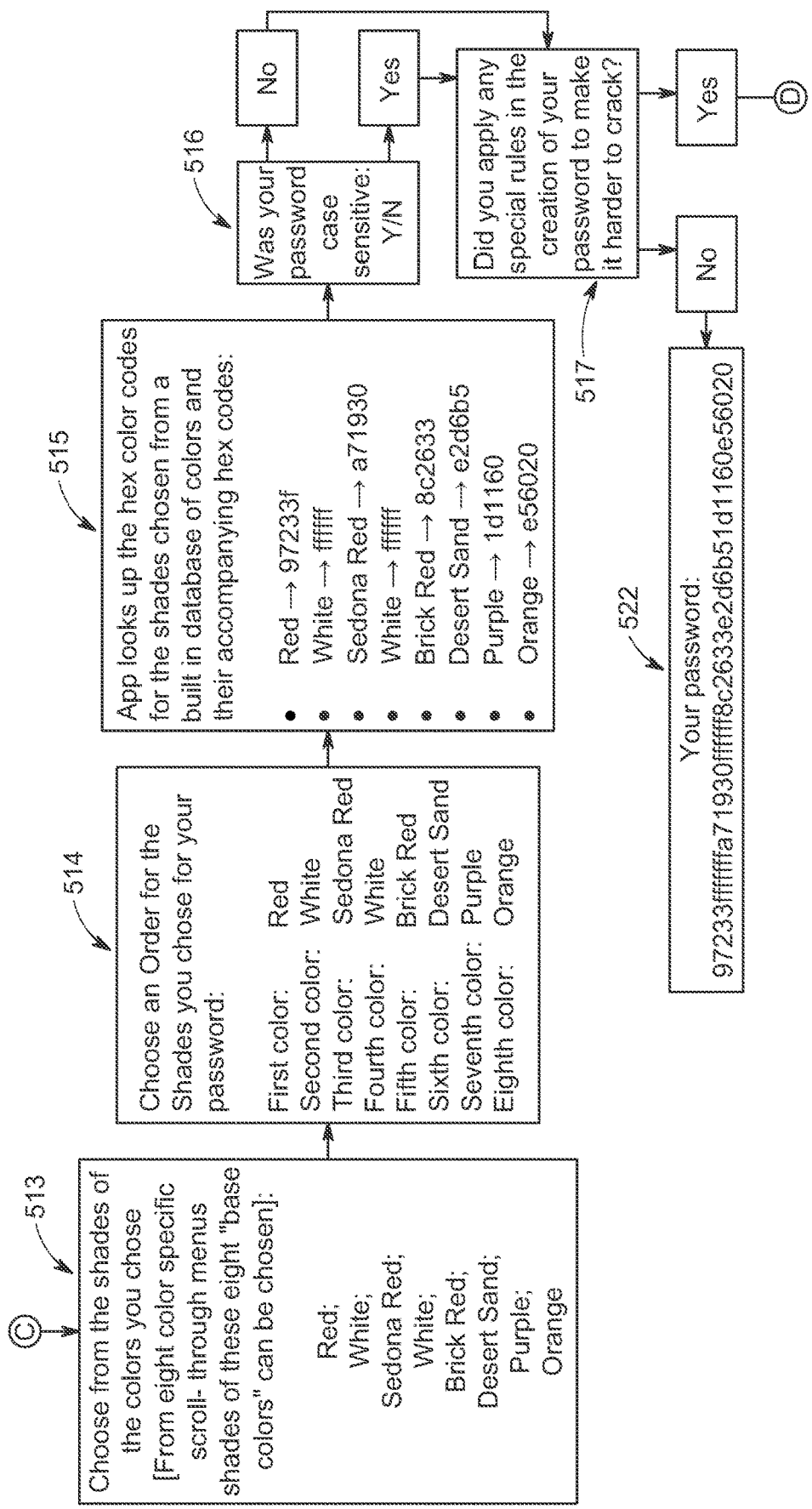
Figure 5:
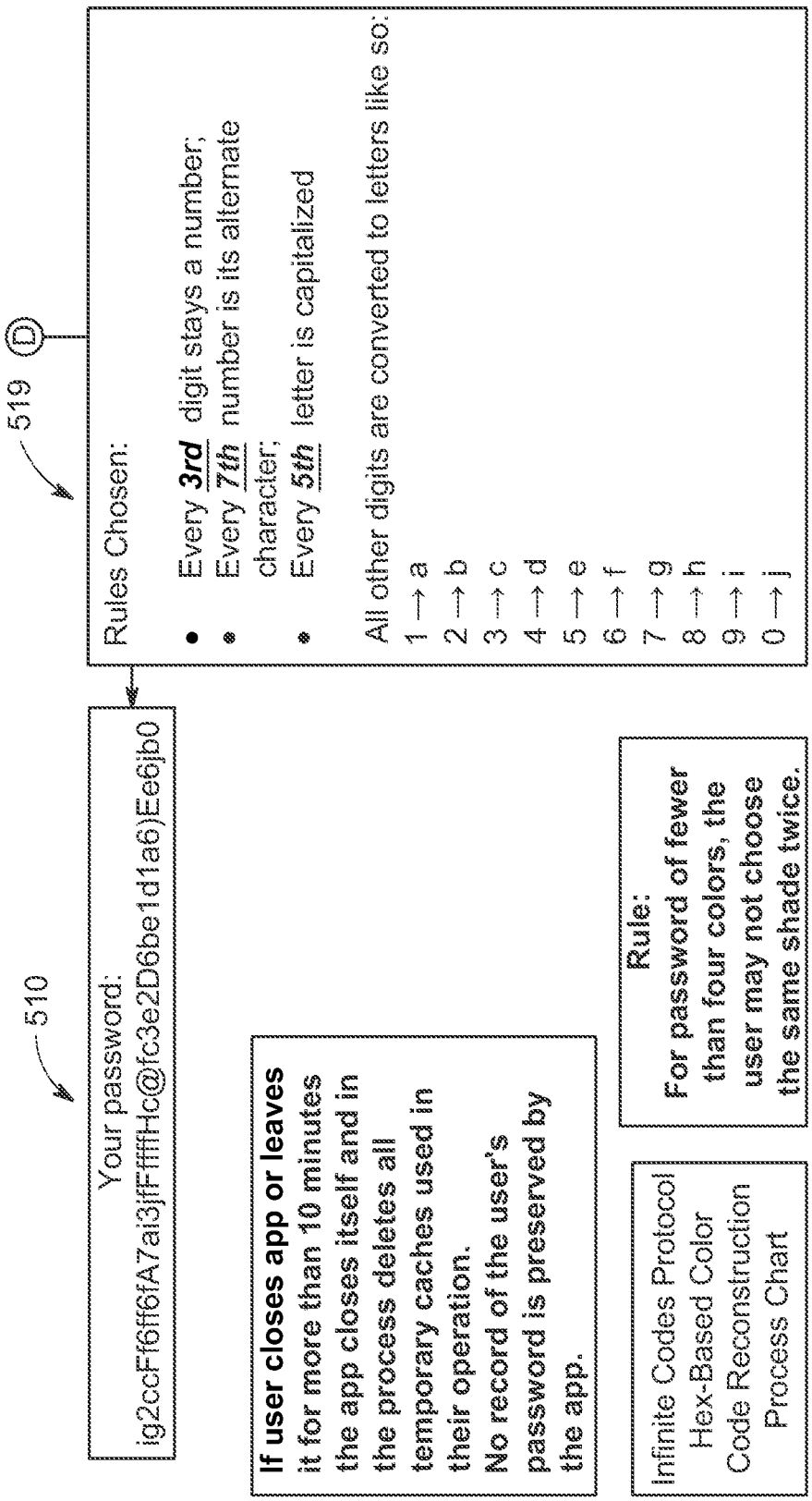
Figure 6:
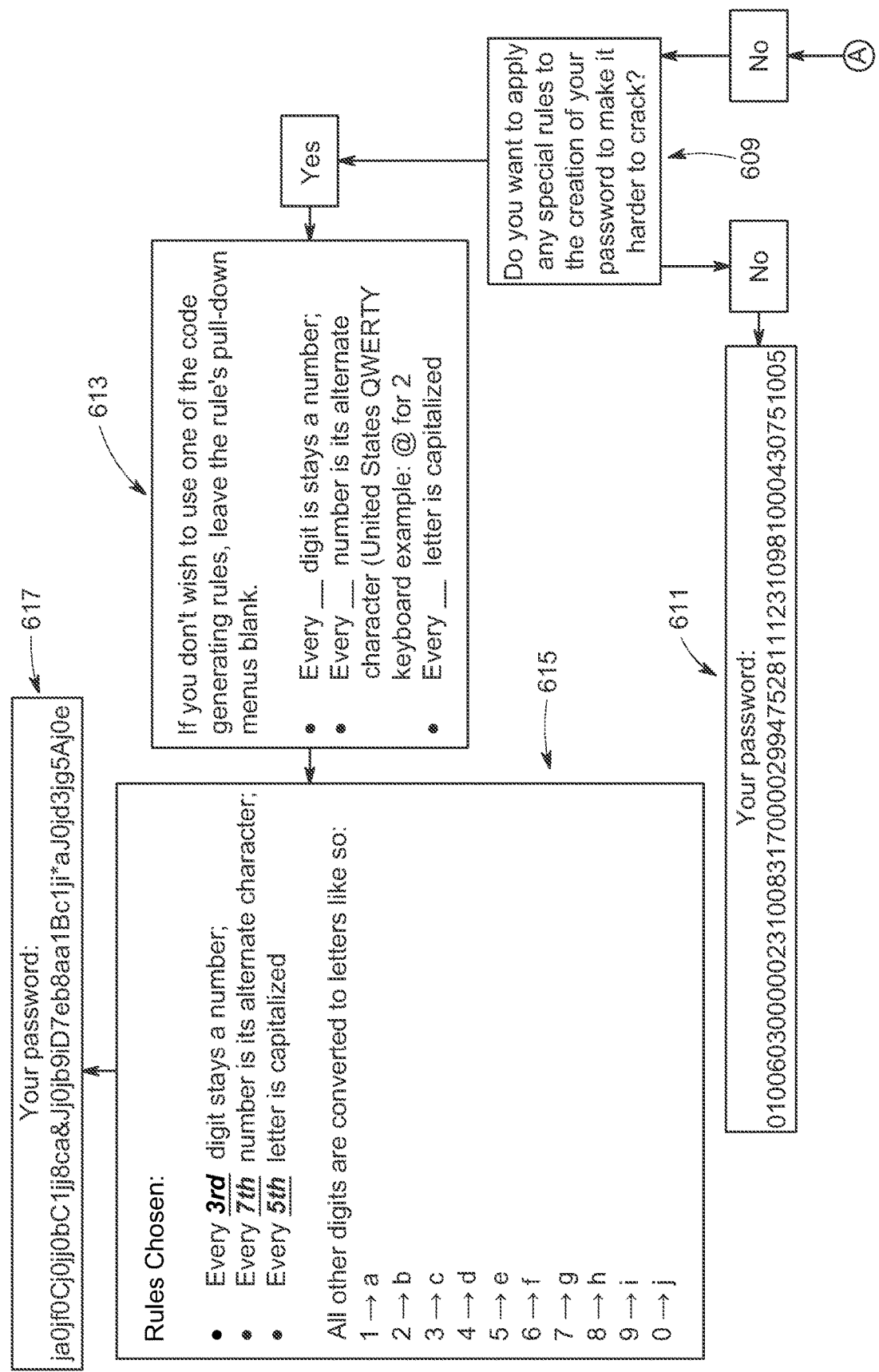
FIG. 6 shows a flowchart for generating a CMYK based color code password using a password code generation and reconstruction system according to an illustrative embodiment.
Figure 6:
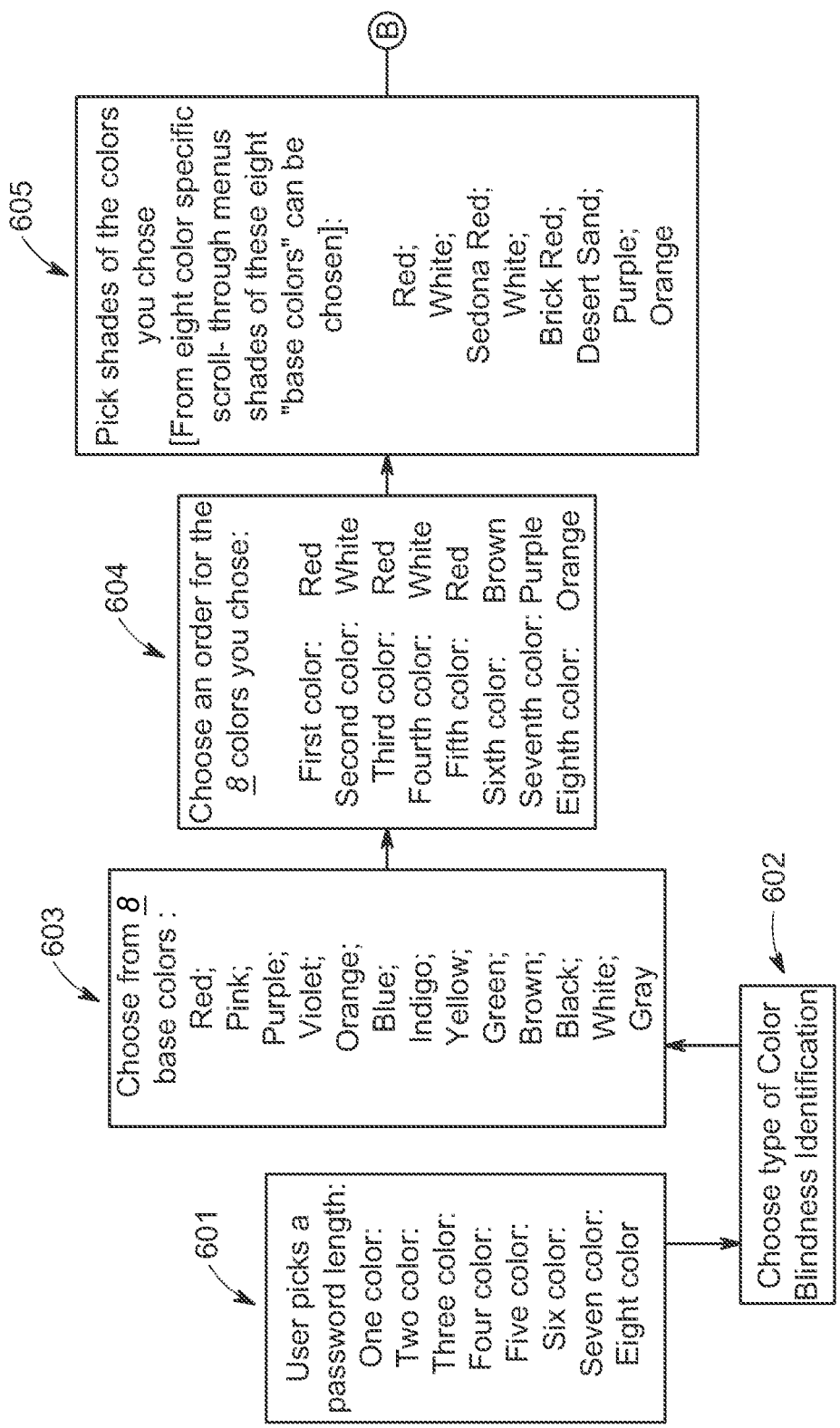
Figure 6:
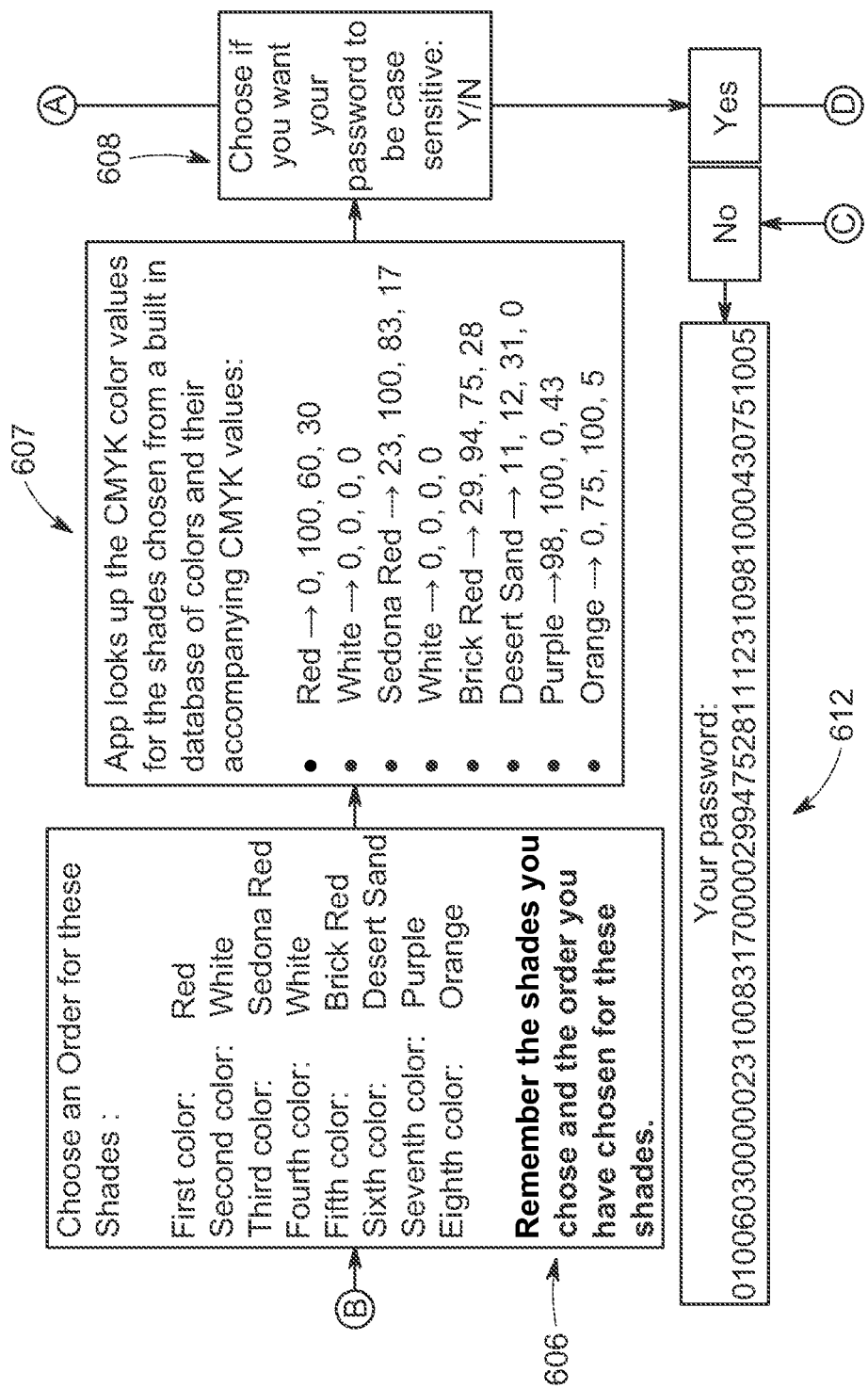
Figure 6:
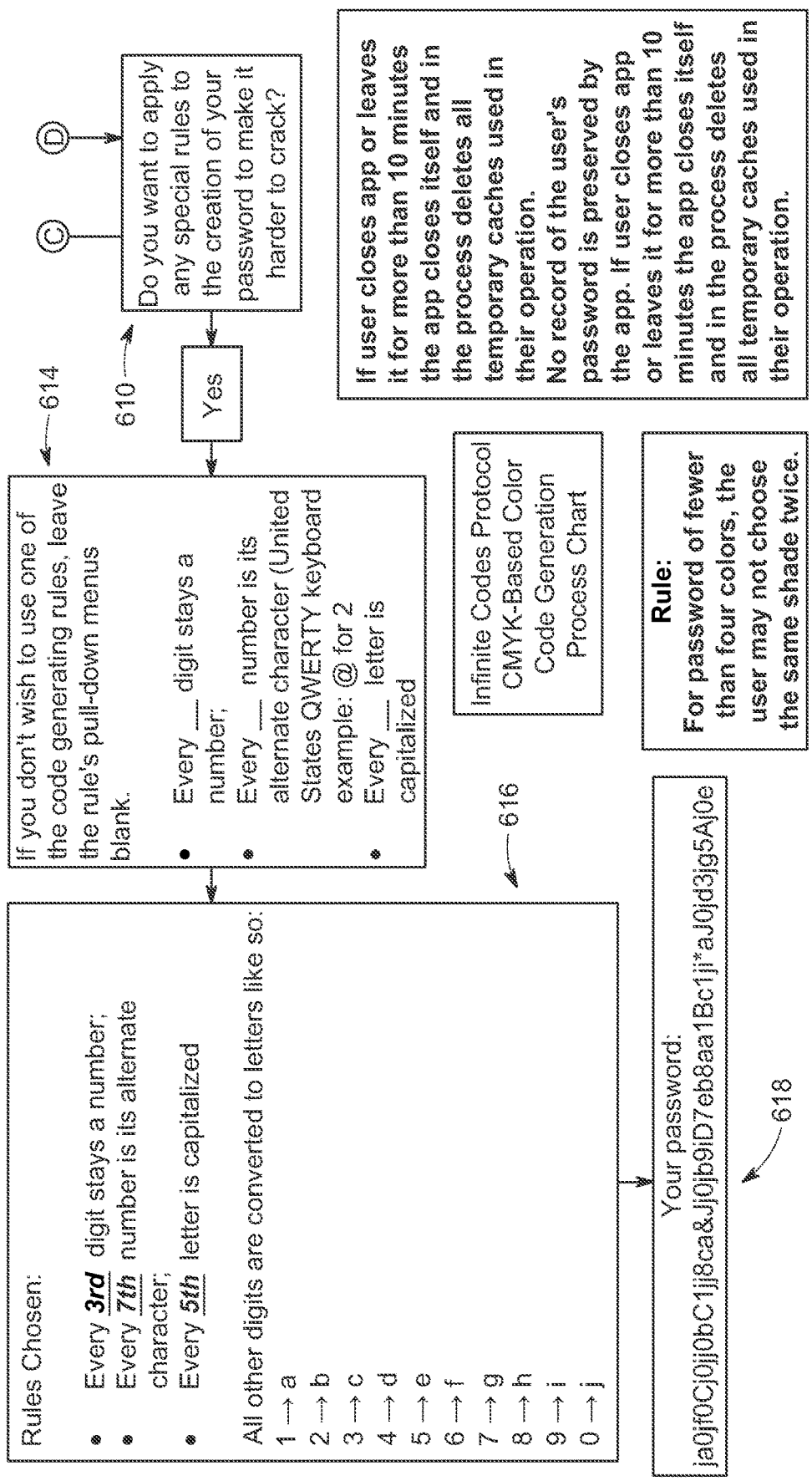

FIG. 4 shows a flowchart for generating a Hex-based color code password using a password code generation and reconstruction system according to an illustrative embodiment. FIG. 5 shows a flowchart for reconstructing a Hex-based color code password using a password code generation and reconstruction system according to an illustrative embodiment. Thus, the steps of FIGS. 2, 4, and 6 are similar, if not the same, but suited for each type of specific color code scheme indicated on each Figure (i.e. FIG. 2 is associated with a PANTONE based color scheme, FIG. 4 is associated with a Hex based color scheme, and FIG. 6 is associated with a CMYK based color scheme). These color schemes, in some embodiments, may be specifically selected by the user or assigned for the user to use in other embodiments by a manufacturer or other administrator of the password generation and reconstruction system 100.

Accordingly, the methods depicted in the flow diagrams showing an embodiment of an exemplary method for implementing password code generation and reconstruction system 100 using an Infinite Codes Protocol for Hex based matching based color code generation. One or more components included in FIG. 1, such as, without limitation, computing devices 125, application 120, and databases 145 are used when implementing this method.

Upon successful activation of Password code generation and reconstruction system 100, user interface 115 may present a display to user 110 whereby user 110 may select an authentication password code to be used in securely accessing content on one or more third party applications or websites.

At step 201 in FIG. 2, user interface 115 may present a display for selecting the length of the password code required as based on the number of colors, whereby code generator 130 may later determine if user 110 has selected the predetermined minimum number of individual shades of colors to generate a code of that length. Examples of character length may include but are not limited to one color, two colors, three colors, four colors, five colors, six colors, seven colors, eight colors, or as expressed in PANTONE color code a number of characters corresponding to each color. For example, if user 110 selects eight colors they may then proceed to generate a password of color codes for eight colors. If the character length selected is shorter than a predetermined minimum threshold such as four colors, code generator 130 may prevent user 110 from selecting two of the same individual shades of color whereby user interface 115 may display an error message to user 110 signifying that user 110 has selected the same individual shade of color twice.

It is noted that the exemplary process for generating a passcode shown in FIG. 4 using a Hex based color scheme and FIG. 6 using a CMYK color scheme, may be similar to that shown in FIG. 2, which uses a PANTONE based color scheme. Accordingly, step 201 is a similar operation to step 401 in FIG. 4 and step 601 in FIG. 6.

At step 202 in FIG. 2, user interface 115 may present a display for selecting the type of colorblindness user 110 may have. It is noted that step 202 is a similar operation to step 402 in FIG. 4 and step 602 in FIG. 6. Color-blind people have difficulty distinguishing various colors. Protanopia is a condition whereby people cannot distinguish properly between red and green, and this condition may also be referred to as red-green color blindness. Color blind people with protanopia may have defective red cone cells in which the red cones cells are not absent, but these people do not detect enough red and are also too sensitive to greens, yellows, and oranges. As a result, greens, yellows, oranges, reds, and browns may appear similar, especially in low light. Red and black might be hard to tell apart, especially when red text is against a black background. Another form of colorblindness is known as deuteranopia in which the retina is deficient in or lacks cone cells containing opsins that respond to the color green, resulting in an inability to distinguish red from green. As a result, greens, yellows, oranges, reds, and browns may appear similar, especially in low light. It can also be difficult to tell the difference between blues and purples, or pinks and grays. For these people, visual discrimination of color-coded data is practically impossible when green, red or yellow data is adjacent.

Protanomaly is another type of color blindness, in which those with this condition may have a reduced sensitivity to red light. Further, those people may have trouble seeing the color purple or the color pink, because seeing the red component in purple or pink is so suppressed that they view only the blue component of the color purple or the white component of pink. As a result, those afflicted with protanomaly often cannot tell the difference between blues and purples, or pinks and grays. Some people may have rod monochromacy which is a rare, non-progressive inability to distinguish any color, resulting from non-functioning or absent retinal cones. Accordingly, such individuals may only see the world around them in black, white, and shades of gray. Rod monochromacy is typically associated with sensitivity to light (Photophobia) and poor vision. There may be many other types of conditions of color blindness or conditions that affect color perception other than those listed above. In one or more embodiments, system 100 is able to take into consideration such issues and allow a user to still utilize password code generation and reconstruction system 100.

After selecting one or more types of color blindness identifications, code generator 130 sends a request to database 145 for associated primary and secondary colors whereby database 145 retrieves colors associated with the color blindness to be presented to user 110 on user interface 115 whereby the colors presented are the ones visible to a user 110 with that type of color blindness. For example, if user 110 selects that they have red-green color blindness, then only the colors blue, indigo, yellow, black, white, and grey may be presented to user 110. Accordingly, red and green are eliminated and not presented as options to user 110 responsive to a user 110's indication of his or her type of color blindness.

At step 203, user interface 11 may display a screen allowing user 110 to select primary colors or secondary colors associated with color blindness identity. For example, primary or secondary colors may include, without limitation thereto, red, pink, purple, violet, orange, blue, indigo, yellow, green, brown, black, white, and gray. Accordingly, step 203 is a similar operation to step 403 in FIG. 4 and step 603 in FIG. 6.

At step 204, after selecting the primary or secondary colors, user interface 115 may display the selected primary colors or secondary colors in a drop down list or by any other method whereby user 110 may rearrange the selected primary colors or secondary in a desired order or arrangement. For example, user 110 may rearrange the colors in the following order: red, white, red, white, red brown, purple, orange After ordering the primary or secondary color selections, code generator 130 may send a request to database 145, whereby database 145 retrieves individual shades of colors associated with one primary or secondary color selected. In other non-limiting embodiments, user interface 115 may allow user 110 to select individual shades of colors without selecting a primary or secondary color. In further embodiments, user 110 may search for individual shades of colors whereby user interface 115 may include a search window for user to enter a search request having a character string whereby one or more individual shades of colors may be identified using name, type, associated primary or secondary colors, or other metadata. Accordingly, step 204 is a similar operation to step 404 in FIG. 4 and step 604 in FIG. 6.

At step 205, user interface 115 may then display a series of screens allowing user 110 to select individual shades of colors associated with each of the one or more primary or secondary colors selected, whereby the screens are displayed in the order the primary or secondary colors are arranged. After each individual shade of color selection, a determination is made whether user 110 has selected the predetermined number of individual shades of colors to create a password code of required length. If not, user 110 may be presented another display for individual shades of color selection. If yes, the method may include user 110 successfully completing the individual shades of color selection part of the password code generation and reconstruction method. Accordingly, step 205 is a similar operation to step 405 in FIG. 4 and step 605 in FIG. 6.

At step 206, user interface 115 may display the selected individual shades of colors in an initial order and may ask user 110 to select the desired order or arrangement. Accordingly, user 110 is able to rearrange the selected colors or shades in any order that is easier for user 110 to remember. For example, if user 110 selected "magenta" and "jade" and "aqua" and "jade" and "sunset" for his or her colors, code generator 130 may then present the individual shades of colors in the original order they were selected. If desired, user may change the listed order of colors, such as for example, rearranging the colors as follows: jade, magenta, aqua, jade, and sunset. Accordingly, step 206 is a similar operation to step 406 in FIG. 4 and step 606 in FIG. 6.

At step 207, the individual shade of color selections by user 110 may be sent as the subject of a request to database whereby code generator 130 may then determine the equivalent sequence of alphanumeric characters and the order for all the individual shades of colors selections and generate an initial password code whereby the initial passcode is a concatenation of the sequences of alphanumeric characters. Accordingly, step 207 is a similar operation to step 407 in FIG. 4 and step 607 in FIG. 6.

At step 208, user interface 115 then may display a prompt to user 110 asking if user 110 wants the final passcode to be case sensitive whereby the text or typed input is sensitive to capitalization of letters. Accordingly, step 208 is a similar operation to step 408 in FIG. 4 and step 608 in FIG. 6.

In one embodiment, at steps 209 and 210, user interface 115 may request if user 110 wishes to apply a special set of transformative rules to edit, select, and apply to the initial password code generated by system 100 to create a more secure final second password code. Accordingly, steps 209 and 210 are a similar operation to steps 409 and 410 in FIG. 4 and steps 609 and 620 in FIG. 6. If user 110 answers no, user interface 115 may then display a screen presenting to user 110 the finalized password code in a window on display as shown at steps 211 and 212. Accordingly, steps 211 and 212 are a similar operation to steps 411 and 412 in FIG. 4 and steps 611 and 612 in FIG. 6.

If user 110 answers yes, user interface 115 may display to user a series of transformative rules to edit, select, and apply to the initial first password code to create a final second password code, as shown at steps 213 and 214. For example, a list of transformative rules may be presented to user 110 in a dropdown list on user interface 115. Accordingly, steps 213 and 214 are a similar operation to steps 413 and 414 in FIG. 4 and steps 613 and 614 in FIG. 6.

In some embodiments, a transformative rule may be modified by user 110 such that user 110 is able to assign a number or letter to a rule to specify conditions under which the rule, when enabled, is to be used in transforming the password code. In other embodiments, a transformative rule may be selected from a set of predefined rules. Transformative rules may include, but are not limited to, modulus operations, character shifting, mirroring, reversing, hashing, derivation, or character replacement. Some examples of rules applied transforming the passphrase into a password code are described below and are also shown in steps 213 and 214.

Every n letter is capitalized
Every n digit stays a number
Every nth number is turned into a letter (such as 1→a, 2→b, 3→c, 4→d 5→e 6→f 7→g 8→h 9→i 0→j).
Every n digit may be replaced by the corresponding keyboard's alternate symbol (such as how one key on a keyboard is occupied by the number 2 and the symbol @).

In one embodiment, the letter "n" signifies a selectable replacement character, number, or digit, as chosen by user 110 to create a more personalized transformative rule. This is extremely helpful because it is much easier for user 110 to remember three characters instead of an entire password and still creates a complex password. For instance, user may wish to use the telephone area code of Fort Meyers, Fla. as the desired three characters. The numbers 2, 3, and 9 make up the telephone area code for Fort Meyers, Fla. and may be applied by the user such that the rules may be structured so that every 2nd letter is capitalized, every 3rd digit stays a number, and every 9th digit may be replaced by the corresponding keyboard's alternate symbol. Steps 215 and 216 in FIG. 2 show that a user may choose that every $3^{rd}$ digit stays a number, every $7^{th}$ number is its alternate character, and every $5^{th}$ letter is capitalized, and then all other digits are converted to letters (as shown for example in steps 215 and 216) such that 1=a, 2=b, 3=c, 4=d, 5=e, 6=f, 7=g, 8=h, 9=i, and 0=j. Although the above steps describe one method of transforming a passphrase into a password, it is contemplated that various other rules may be used.

Further, it is noted that user 110 may also optionally choose not to edit the default or standard transformative rules applied by password code generation system 100 and leave them blank so as the transformative rules not edited do not have an effect on the second generated password code.

At steps 215 and 216, user interface 115 may display a screen presenting to user 110 the transformative rules they have selected to use or have edited. Code generator 130 then is able to transform the initial password code into a final password code using one or more rules requested from database 145 and chosen and edited by user 110. Accordingly, steps 215 and 216 are a similar operation to steps 415 and 416 in FIG. 4 and steps 615 and 616 in FIG. 6.

At steps 217 and 218, user interface 115 may then display a screen presenting to user 110 the finalized password code, which user 110 may then easily copy and paste as needed in another application or website. Accordingly, steps 217 and 218 are a similar operation to steps 417 and 418 in FIG. 4 and steps 617 and 618 in FIG. 6. As shown at steps 211 and 212 in FIGS. 2, 411 and 412 in FIG. 4, and 611 and 612 in FIG. 6, and at steps 217 and 218, 417 and 418, and 617 and 618 in these respective Figures, the passwords generated are complex and would be extremely difficult for a third party to guess. Such passwords should be more secure in nature and help to prevent online crime and identity theft.

Password code generation and reconstruction system 100 may additionally feature an automatic copy/paste function whereby the content of the generated password code presented in the panel may be copied and pasted into the relevant text readout box on a web page or other application requesting a password code for enrollment or for identity verification. Further, user 110 may simply manually paste the password into a password field using any means known in the art for copying and pasting or selecting text on a computing device, such as computing device 125.

In some embodiments of password code generation and reconstruction system 100, generated password code may be saved to a "keychain" or other password management system. The "keychain" may be discoverable to other computing devices 125 belonging to user 110. Saving to a keychain may assist in supplying the generated passcode as generated by passcode generation and reconstruction system 100, which includes one or more embodiments for generating and reconstructing a complicated password by simply remembering a color sequence and one or more transformation rules, while accounting for the user forgetting the colors and rules because of memory loss or by stroke, aneurysm, cancer, or for any other reason.

FIG. 3 shows an exemplary method for reconstruction of a passcode using password code generation and reconstruction system 100 based on a PANTONE color matching scheme. This method shown in the flow diagram of FIG. 3 is similar to the generation method shown in FIG. 2, but the steps directed at user 110 assist user 110 in recollecting or regenerating the password code they have already created through password code generation and reconstruction system 100.

At step 301, user interface 115 may present a display for selecting the length of the password code that was previously selected by user 110 during generation method whereby code generator 130 may later determine if user 110 has selected the predetermined minimum number of individual shades of colors to reconstruct a code of that length.

Figure 7:
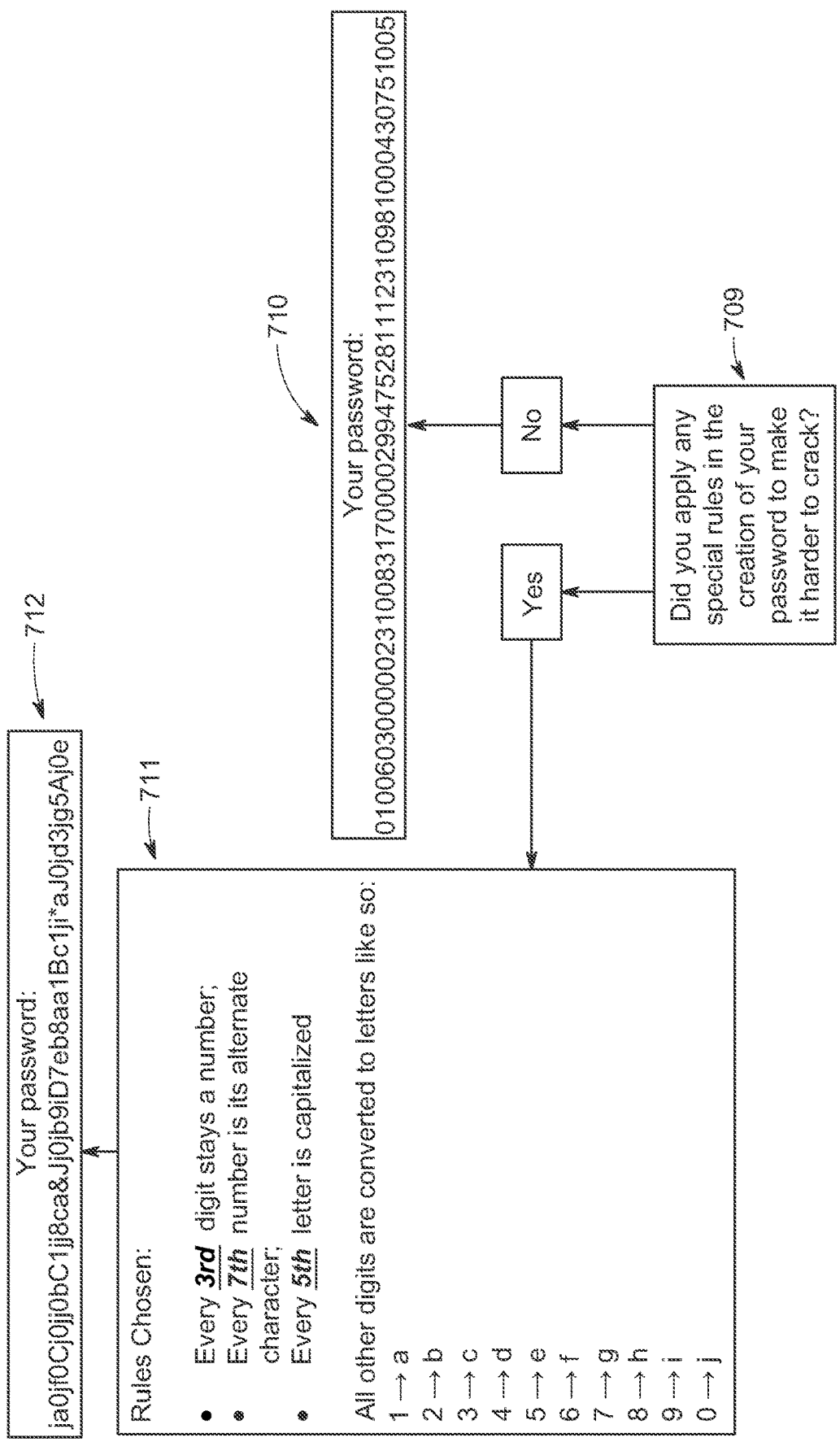
FIG. 7 shows a flowchart for reconstructing a CMYK based color code password using a password code generation and reconstruction system according to an illustrative embodiment.
Figure 7:
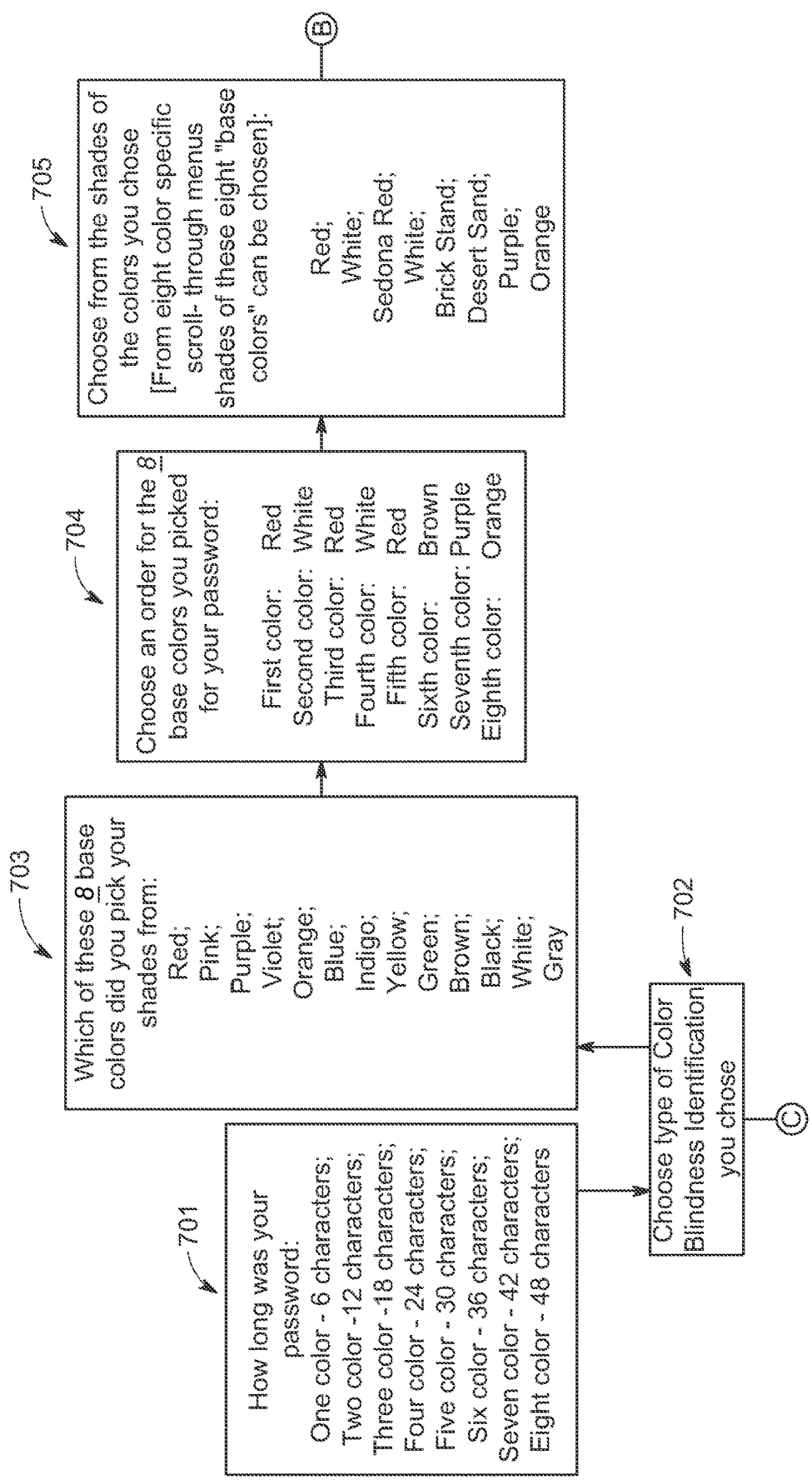
Figure 7:
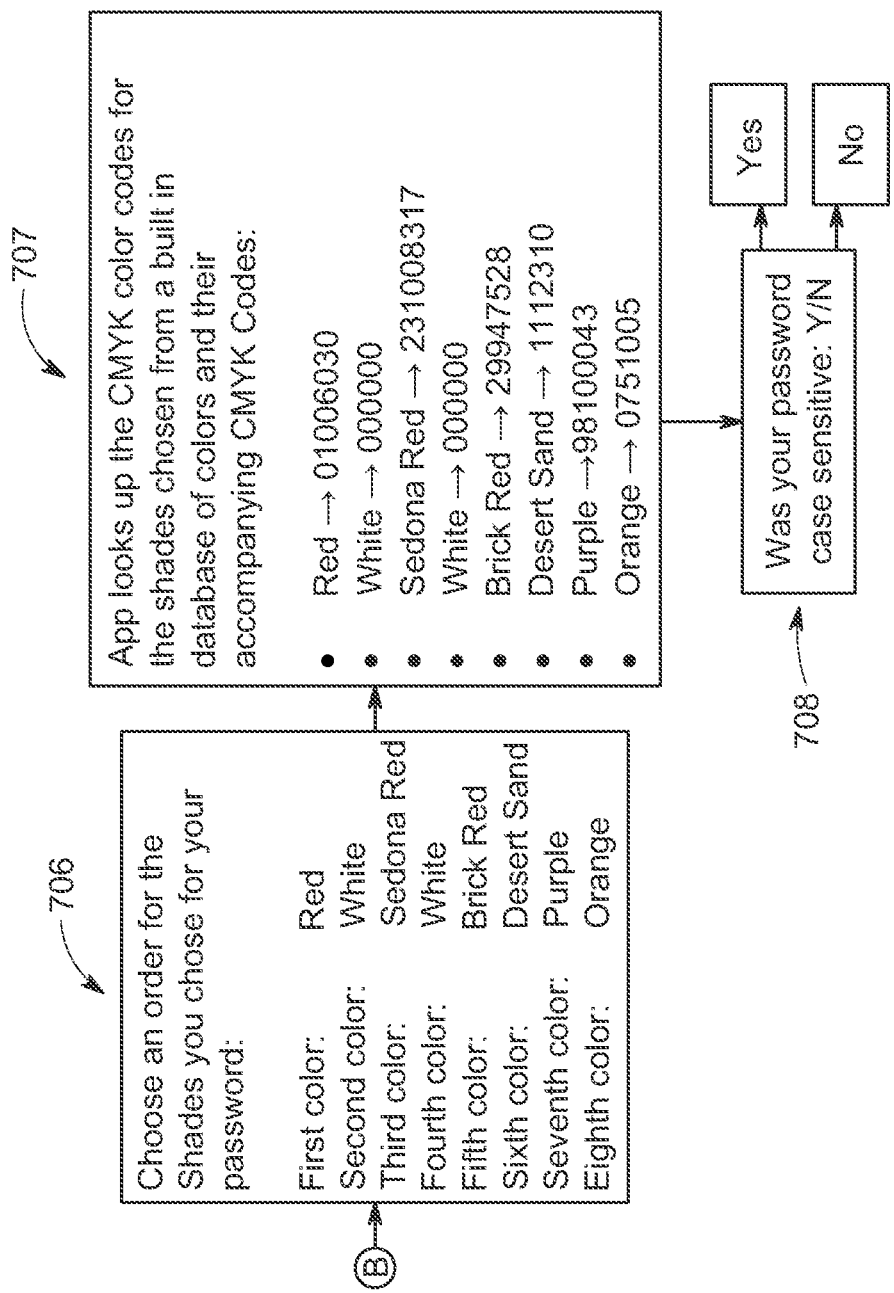
Figure 7:
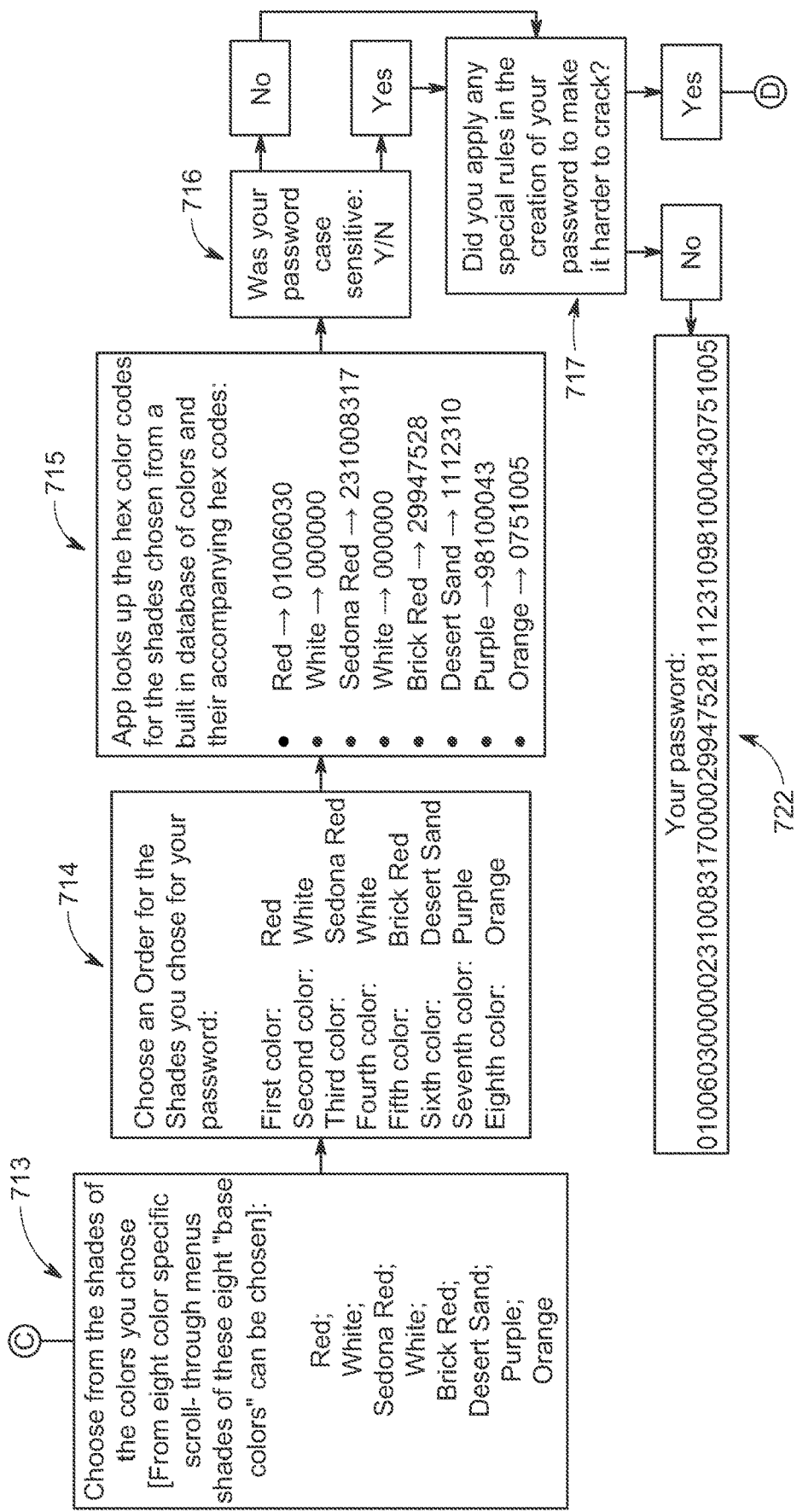
Figure 7:
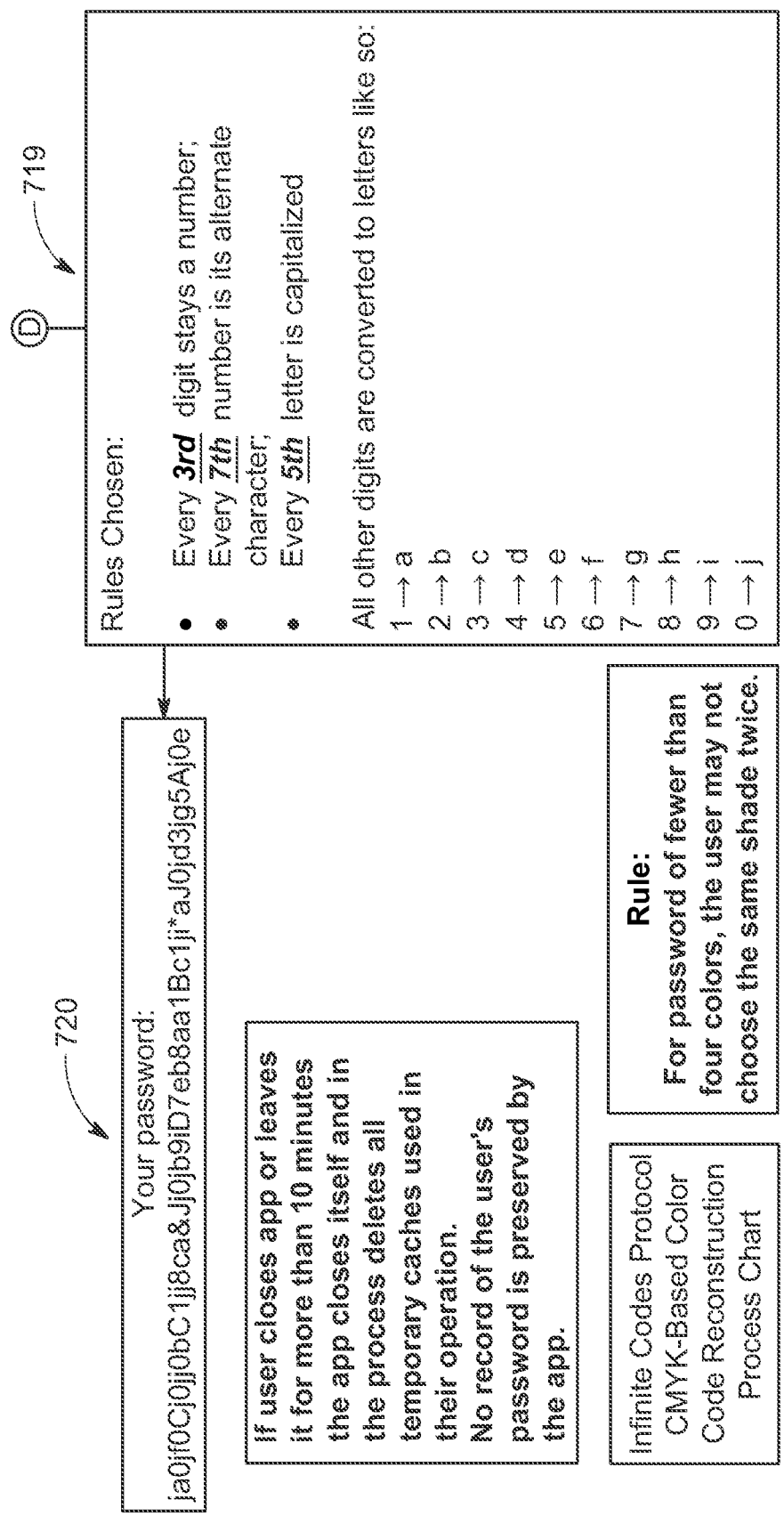

It is noted that FIG. 5 illustrates flow diagrams showing an exemplary method for reconstruction of a user's already created password via password code generation and reconstruction system 100 using an Infinite Codes Protocol with a Hex based color code scheme. FIG. 7 illustrates a flow diagram showing an exemplary method for reconstruction of a user's already created password via password code generation and reconstruction system 100 using an Infinite Codes Protocol with CMYK based color code scheme. The password reconstruction methods shown in FIG. 5 and FIG. 7 are similar to the password reconstruction method illustrated in FIG. 3, whereby steps 301 is similar to step 501 in FIG. 5 and step 701 in FIG. 7. Thus, the steps of FIGS. 3, 5, and 7 are similar, if not the same, but suited for each type of specific color code scheme indicated on each Figure (i.e. FIG. 3 is associated with a PANTONE color scheme, FIG. 5 is associated with a Hex based color matching scheme, and FIG. 7 is associated with a CYMK based color scheme). These color schemes, in some embodiments, may be specifically selected by the user or assigned for the user to use in other embodiments by a manufacturer or other administrator of the password generation and reconstruction system 100.

At step 302, system 100 requests the type of colorblindness that was previously selected by user 110 during the initial generation of the user's passcode. After selecting one or more types of color blindness identifications (including no type of color blindness), code generator 130 sends a request to database 145 for associated colors with that type of color blindness whereby database 145 retrieves colors associated with the color blindness to be presented to user 110 on user interface 115. Accordingly, the colors presented to user 110 are the ones visible to user 110 with that type of color blindness. For example, if user 110 selects that they have red-green color blindness, the colors blue, indigo, yellow, black, white and grey may be presented to user 110. Accordingly, step 302 is a similar operation to step 502 in FIG. 5 and step 702 in FIG. 7.

At step 303, user interface 115 may display a screen allowing user 110 to select primary colors or secondary colors that were previously selected by user 110 during generation method. At step 304, after selecting the primary or secondary colors, user interface 115 may display the selected primary colors or secondary colors on drop down list or by another method, so that user 110 may rearrange the selected primary colors or secondary as previously arranged by user 110 during the password generation process. Accordingly, step 304 is a similar operation to step 504 in FIG. 5 and step 704 in FIG. 7.

After ordering the primary or secondary color selections, code generator 130 may send a request to database 145 whereby database 145 retrieves individual shades of colors associated with one primary or secondary colors selected. In other non-limiting embodiments, user interface 115 may allow user 110 to select individual shades of colors without selecting a primary or secondary color. In further embodiments, user 110 may search for individual shades of colors whereby user interface 115 may include a search window for user to enter a search request having a character string whereby one or more individual shades of colors may be identified using name, type, associated primary or secondary colors, or other metadata. Accordingly, step 303 is a similar operation to step 503 in FIG. 5 and step 703 in FIG. 7.

At step 305, user interface 115 may then display a series of screens allowing user 110 to select individual shades of colors associated with each of the one or more primary or secondary color that was previously selected by user 110 during the password generation process, according to one or more embodiments, whereby the screens are displayed in the order that the primary or secondary colors were arranged. After each individual shade of color selection, it is then determined if user 110 has selected the predetermined number of individual shades of colors to create a password code of required length. If no, user 110 may be presented another display for individual shades of color selection. If yes, the method may include user 110 successfully completing the individual shades of color selection part of the password code reconstruction method. Accordingly, step 305 is a similar operation to step 505 in FIG. 5 and step 705 in FIG. 7.

If the color selection part of the generation method is completed, at step 306 user interface 115 may display the selected individual shades of colors on an ordered/ordinal drop down list whereby user 110 may rearrange the individual shades of colors as previously arranged by user 110 during the password generation method. Accordingly, step 306 is a similar operation to step 506 in FIG. 5 and step 706 in FIG. 7.

At step 307, the individual shade of color selections made by user 110 may be sent as the subject of a request to a database (e.g. database 145) whereby code generator 130 may then determine the equivalent sequence of alphanumeric characters and the order for all the individual shades of colors selections according to which color scheme was selected and reconstruct an initial password code whereby the initial passcode is a concatenation of the sequences of alphanumeric characters. The term "concatenation" refers to the act of linking the codes together in a series to create a passcode.

Thus, as shown in FIG. 3, at step 307, each color as initially chosen by a user has an associated code that may be a combination of numbers, alphabetical characters, and/or symbols. At step 307, as shown in FIG. 3, the color "Red" is associated with the code "194 C", the color "White" is associated with "11-0601-TCX", and other colors are listed there as well with their respective codes. Accordingly, step 307 is a similar operation to step 507 in FIG. 5 and step 707 in FIG. 7. In one or more embodiments, the colors may be automatically associated with respective codes based on the color scheme by a computer program or application so that the user does not have to remember the codes.

At step 308, user interface 115 then may display a prompt to user 110 asking if user 110 previously selected during generation method that they wanted the final passcode to be case sensitive whereby the text or typed input is sensitive to capitalization of letters. Accordingly, step 308 is a similar operation to step 508 in FIG. 5 and step 708 in FIG. 7.

At step 309 after the initial password code has been generated by code generator 130 during the color selection and color arrangement process, user interface 115 may request if user 110 previously chose during the code generation method, a series of transformative rules to edit, select, and apply to the initial first password code to create a more difficult final second password code. Accordingly, step 309 is a similar operation to step 509 in FIG. 5 and step 709 in FIG. 7. If user 110 answers no, then user interface 115 may display a screen presenting to user 110 the finalized reconstructed password code in a window on display at step 310. Accordingly, step 310 is a similar operation to step 510 in FIG. 5 and step 710 in FIG. 7.

At step 311, user interface 115 may then display a screen presenting to user 110 with the transformative rules that were previously selected by user 110 during the passcode generation method. Code generator 130 is then able to transform the initial password code into a final password code using one or more rules requested from database 145 and chosen and edited by user 110. Accordingly, step 311 is a similar operation to step 511 in FIG. 5 and step 711 in FIG. 7.

At step 312, user interface 115 may then display a screen presenting to user 110 the finalized reconstructed password code. Accordingly, step 312 is a similar operation to step 512 in FIG. 5 and step 712 in FIG. 7.

In some embodiments, after selecting color blindness identification, user interface 115 may present the user with the ability to directly select the individual shades of color instead of the primary or secondary colors as shown at step 303. At step 313, user interface 115 may present user 110 with the ability to select individual shades of colors associated with those that were previously selected by user 110 during generation method. Accordingly, step 313 is a similar operation to step 513 in FIG. 5 and step 713 in FIG. 7.

At step 314, user interface 115 may display the selected individual shades of colors on an ordered/ordinal drop down list whereby user 110 may rearrange the individual shades of colors as previously arranged during the password generation process. Accordingly, step 314 is a similar operation to step 514 in FIG. 5 and step 714 in FIG. 7.

At step 315, the individual shade of color selections by user 110 may be sent as the subject of a request to database whereby code generator 130 may then determine the equivalent sequence of alphanumeric characters and the order for all the individual shades of colors selections and reconstruct an initial password code whereby the initial passcode is a concatenation of the sequences of alphanumeric characters representing the colors chosen by user 110. Accordingly, step 315 is a similar operation to step 515 in FIG. 5 and step 715 in FIG. 7.

At step 316, user interface 115 may then display a prompt to user 110 asking if user 110 previously selected during the generation method to have the final passcode be case sensitive whereby the text or typed input is sensitive to capitalization of letters. Accordingly, step 316 is a similar operation to step 516 in FIG. 5 and step 716 in FIG. 7.

At step 317, after the initial password code has been generated by code generator 130 during the color selection and color arrangement process, user interface 115 may request if user 110 previously selected during the code generation method to use a series of transformative rules to edit, select, and apply to the initial first password code to create a more secure final second password code. Accordingly, step 317 is a similar operation to step 517 in FIG. 5 and step 717 in FIG. 7. If user 110 answers no, then user interface 115 may display a screen presenting to user 110 the finalized reconstructed password code in a window on display at step 322.

If user 110 answers yes, at step 319, user interface 115 may then display a screen presenting to user 110 the transformative rules to edit the rules in a way that was previously selected by user 110 during the password generation method. Code generator 130 is then able to transform the initial password code into a final password code using one or more rules requested from database 145 and chosen and edited by user 110. Accordingly, step 319 is a similar operation to step 519 in FIG. 5 and step 719 in FIG. 7.

At steps 320 and 322, user interface 115 may then display a screen presenting to user 110 the finalized reconstructed password code. Accordingly, steps 320 and 322 are a similar operation to step 520 and 522 in FIG. 5 and steps 720 and 722 in FIG. 7.

In some embodiments, additional complexity may be applied when generating a final password code whereby the simultaneous use of multiple color systems may be used to construct a password code instead of just one color system. For instance, in order, the colors selected may be red, white, and blue. Red may have a corresponding CMYK color identification of 01001000. Blue may have a corresponding RGB color identification 00255. White may have a corresponding hexadecimal color identification of ff0000. Password Code Generation and Reconstruction system 110 may then concatenate the CMYK value for Red, the Hex code for White and the RGB value for Blue, creating an initial password code of 01001000ffffff00255. Additional rules may be applied to the initial password code such as: Capitalize every other letter starting with the first letter; Keep every other number a digit starting with the second number; Transform every third number into its alternate keyboard symbol starting with the third number. With these rules applied to the initial password code, a final password code of 01)01)00FfFfFf)02%5 may be generated and then later reconstructed with a similar method.

Figure 8:
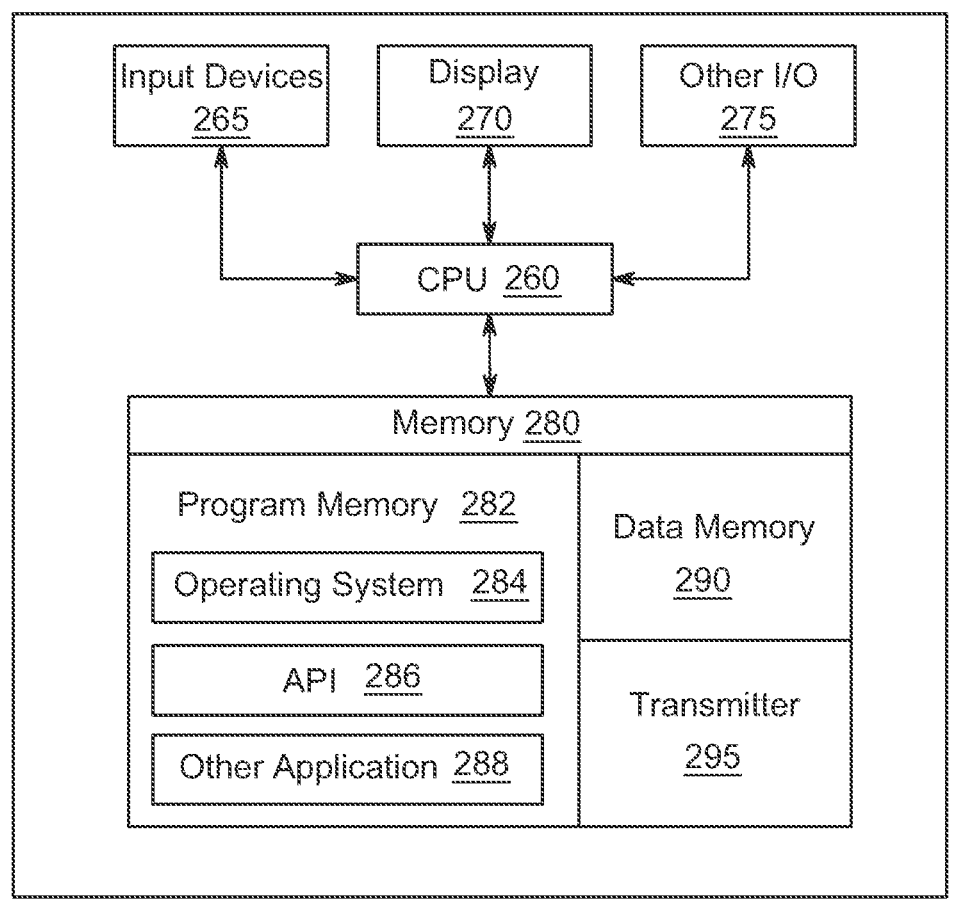
FIG. 8 shows an exemplary block diagram of various components of a computing device according to an illustrative embodiment.

Turning to FIG. 8, FIG. 8 is a block diagram showing various components of computing device 125. Computing device 125 may comprise a housing for containing one or more hardware components that allow access to edit and query password code generation and reconstruction system 100. Computing device 125 may include one or more input devices such as input devices 265 that provide input to a CPU (processor) such as CPU 260 of actions related to user 110. Input devices 265 may be implemented, without limitation thereto, as a keyboard, a touchscreen, a mouse, via voice activation, wearable input device, a camera a trackball, a microphone, a fingerprint reader, an infrared port, a controller, a remote control, a fax machine, and combinations thereof.

The actions may be initiated by a hardware controller that interprets the signals received from input device 265 and communicates the information to CPU 260 using a communication protocol. CPU 260 may be a single processing unit or multiple processing units in a device or distributed across multiple devices. CPU 260 may be coupled to other hardware devices, such as one or more memory devices with the use of a bus, such as a PCI bus or SCSI bus. CPU 260 may communicate with a hardware controller for devices, such as for a display 270. Display 270 may be used to display text and graphics. In some examples, display 270 provides graphical and textual visual feedback to a user.

In one or more embodiments, display 270 may include an input device 265 as part of display 270, such as when input device 265 is a touchscreen or is equipped with an eye direction monitoring system. In some implementations, display 270 is separate from input device 265. Examples of display 270 include but are not limited to: an LCD display screen, an LED display screen, a projected, holographic, virtual reality display, or augmented reality display (such as a heads-up display device or a head-mounted device), wearable device electronic glasses, contact lenses capable of computer-generated sensory input and displaying data, and so on. Display 270 may also comprise a touch screen interface operable to detect and receive touch input such as a tap or a swiping gesture. Other I/O devices, such as I/O devices 275, may also be coupled to the processor, such as a network card, video card, audio card, USB, FireWire or other external device, camera, printer, speakers, CD-ROM drive, DVD drive, disk drive, or Blu-Ray device. In further non-limiting embodiments, a display may be used as an output device, such as, but not limited to, a computer monitor, a speaker, a television, a smart phone, a fax machine, a printer, or combinations thereof.

CPU 260 may have access to a memory such as memory 280. Memory 280 may include one or more of various hardware devices for volatile and non-volatile storage and may include both read-only and writable memory. For example, memory 280 may comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. Memory 280 may be a non-transitory memory.

Memory 280 may include program memory, such as program memory 282, capable of storing programs and software, including an operating system, such as operating system 284. Memory 280 may further include an application programing interface (API), such as API 286, and other computerized programs or application programs such as application programs 288. Memory 280 may also include data memory such as data memory 290 that may include database query results, configuration data, settings, user options, user preferences, or other types of data, which may be provided to program memory 282 or any element of computing device 125.

Computing device 125, may in some embodiments, be a computing device such as an iPhone™, Android-based phone, or Windows-based phone, a tablet, television, desktop computer, laptop computer, gaming system, wearable device electronic glasses, networked router, networked switch, networked, bridge, or any computing device capable of executing instructions with sufficient processor power and memory capacity to perform operations of password code generation and reconstruction system 100 while in communication with network. Computing device 125 may have location tracking capabilities such as Mobile Location Determination System (MLDS) or Global Positioning System (GPS) whereby they may include one or more satellite radios capable of determining the geographical location of computing device.

Computing device 125 may have a transmitter 295, such as transmitter 295. Transmitter 295 may have a wired or wireless connection and may comprise a multi-band cellular transmitter to connect to the server 120 over 2G/3G/4G cellular networks. Other embodiments may also utilize Near Field Communication (NFC), Bluetooth, or another method to communicate information.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A system for generating a password code:
one or more processors and a non-transitory computer readable medium having instructions that, when executed, cause the one or more processors to perform the following steps:
receive an input from a user, the input comprising one or more individual shades of color selections, wherein the one or more individual shades of color selections are configured to be used as a first password generation phrase to be input into a password code generation and reconstruction engine;
identify a sequence of associated alphanumeric characters for each of the one or more individual shades of color selections received from the user by executing a request in one or more databases for one or more sequences of associated alphanumeric characters wherein database requests are obfuscated or anonymized with respect to the user;
receive the one or more sequences of associated alphanumeric characters from the one or more databases by the password code generation and reconstruction engine; execute a request using the one or more sequences of associated alphanumeric characters to generate a first password code, the first password code comprising the respective alphanumeric characters from each of the one or more sequences;
wherein the processor is configured to further perform:
receive an input from the user, the input comprising one or more primary or secondary color selections;
identify the one or more individual shades of colors for each of the one or more primary or secondary color selections received from the user by executing a request in one or more databases for one or more sequences of associated individual shades of colors;
receive the associated individual shades of colors from the one or more databases by the password code generation and reconstruction engine; and display the associated individual shades of colors to the user;
receive an input from the user, the input comprising one or more colorblindness identification selections;
identify associated primary and secondary colors for each of the one or more colorblindness identification selections received from the user by executing a request in the one or more databases, the one or more databases having one or more sequences of one or more colorblindness identification selections; and receive the one or more primary or secondary color selections from the one or more databases by the password and reconstruction engine; and display adjusted primary colors or secondary colors to the user.

2. A system for generating a password code:

one or more processors and a non-transitory computer readable medium having instructions that, when executed, cause the one or more processors to perform the following steps:

receive an input from a user, the input comprising one or more individual shades of color selections, wherein the one or more individual shades of color selections are configured to be used as a first password generation phrase to be input into a password code generation and reconstruction engine;

identify a sequence of associated alphanumeric characters for each of the one or more individual shades of color selections received from the user by executing a request in one or more databases for one or more sequences of associated alphanumeric characters wherein database requests are obfuscated or anonymized with respect to the user;

receive the one or more sequences of associated alphanumeric characters from the one or more databases by the password code generation and reconstruction engine; execute a request using the one or more sequences of associated alphanumeric characters to generate a first password code, the first password code comprising the respective alphanumeric characters from each of the one or more sequences;

wherein the processor is configured to further perform:

access a database of transformative rules chosen by the user to be applied to the first password code:

receive the transformative rules from the database by the password code generation and reconstruction engine;

execute a request applying the transformative rules to generate a second password code from the first password code;

display the second password code to the user;

permit user selected predefined editing of the transformative rules;

apply an operator to the one or more sequences of the associated alphanumeric characters selected by the user thereby so as to form the first password code with a specific order of alphanumeric characters from each of the one or more sequences of the associated alphanumeric characters;

receive an input from the user, the input comprising the amount of the one or more sequences of the associated alphanumeric characters required in generating the first password code;

provide a number of individual shades of color selections to the user corresponding to the amount of the one or more sequences of the associated alphanumeric characters required;

detect a lack of input from the user, wherein when the lack of input passes a threshold for a predetermined amount of time the system accesses a shutdown system for deleting all created data pertaining to the user's selections during a last session; and wherein the one or more sequences of the associated alphanumeric characters is based on a value of any one of:

hexadecimal color code or identification scheme, red, green, blue (RGB) color model or scheme, cyan, magenta, yellow and key/black (CMYK) color model or scheme, and PANTONE color scheme matching system.

* * * * *